US006308185B1

(12) United States Patent
Grarup et al.

(10) Patent No.: US 6,308,185 B1
(45) Date of Patent: Oct. 23, 2001

(54) METHODS AND APPARATUS FOR GENERATIONAL DYNAMIC MANAGEMENT OF COMPUTER MEMORY

(75) Inventors: Steffen Grarup; Lars Bak, both of Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/247,817

(22) Filed: Feb. 9, 1999

Related U.S. Application Data

(60) Provisional application No. 60/077,069, filed on Mar. 6, 1998.

(51) Int. Cl.$^7$ .................................................. G06F 17/30
(52) U.S. Cl. ............................................................ 707/206
(58) Field of Search ............................................... 707/206

(56) References Cited

U.S. PATENT DOCUMENTS

| 5,845,298 | * | 12/1998 | O'Connor et al. | 707/206 |
| 5,903,900 | * | 5/1999 | Knippel et al. | 707/206 |
| 5,953,736 | * | 9/1999 | O'Connor et al. | 711/6 |
| 6,148,310 | * | 11/2000 | Azagury et al. | 707/206 |

OTHER PUBLICATIONS

Hudson, et al., "Incremental Collection of Mature Objects", International Workshop on Memory Management, St. Malo, France, Sep. 1992.
Hosking et al., "Remembered Sets Can Also Play Cards" Position Paper for OOPSLA '93 Workshop on Memory Management and Garbage Collection, Washington, D.C., Oct. 1993.
Seligman et al., "Incremental Mature Garbage Collection Using the Train Algorithm" Proceedings of ECOOP '95, Ninth European Conference on Object–Oriented Programming, Lecture Notes in Computer Science, vol. 952, pp. 235–252, Springer Verlag, 1995.
Hosking A L et al., "A Comparative Performance Evaluation of Write Barrier Implementations" ACM Sigplan Notices, vol. 27, No. 10, Oct. 1, 1992, pp. 92–109.
Urs Hölzle, A Fast Write Barrier for Generational Garbage Collectors, Oct. 1993, Presented at the OOPSLA '93 Garbage Collection Workshop, Washington, D.C.
Jones et al., "Garbage Collection Algorithms for Automatic Dynamic Memory Management", Date Unknown, pp. 164–181.

* cited by examiner

Primary Examiner—Paul V. Kulik
(74) Attorney, Agent, or Firm—Beyer Weaver & Thomas LLP

(57) ABSTRACT

The present invention relates to methods and apparatus for performing generational garbage collection within computer memory. According to one aspect of the present invention, a computer-implemented method for dynamically managing memory which includes a first memory section and a second memory section that is divided into a plurality of blocks each having an associated marker, includes performing a first garbage collection on the first memory section. The method also includes performing a second garbage collection on a selected one of the blocks in the second memory section. A third garbage collection is performed on the selected block in the second memory section. The third garbage collection includes determining whether the selected block includes a first object which references a second object which is not included in the selected block based at least in part on a status indicated by the marker associated with the selected block. The status includes an indication of whether the reference to the second object was stored after the second garbage collection was performed, and if the reference to the second object was stored after the second garbage collection was performed, a new root array is created using the selected marker.

49 Claims, 15 Drawing Sheets

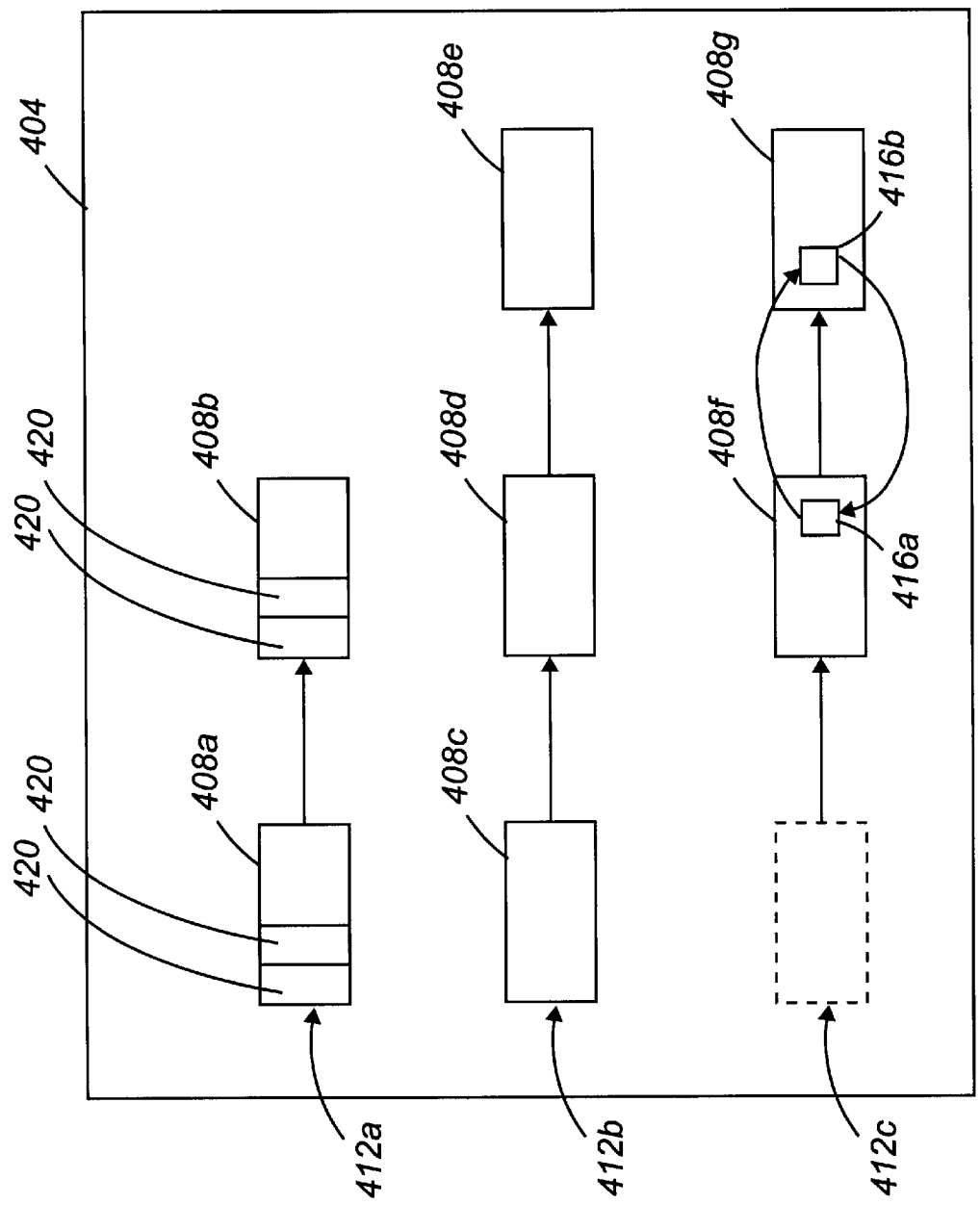

METHODS AND APPARATUS FOR GENERATIONAL DYNAMIC MANAGEMENT OF COMPUTER MEMORY

CROSS-REFERENCE TO RELATED APPLICATION

The present invention claims priority of co-pending provisional U.S. patent application Ser. No. 60/077,069, filed Mar. 6, 1998, which is incorporated herein by reference in its entirety.

BACKGROUND OF THE INVENTION

1. Field of Invention

The invention relates generally to the management of dynamically allocated memory in a computer system. More particularly, the invention relates to tracking references between separate sections of memory associated with a computer system such that automatic storage-reclamation may be performed locally.

2. Description of the Relevant Art

The amount of memory associated with a computer system is typically limited. As such, memory must generally be conserved and recycled. Many computer programming languages enable software developers to dynamically allocate memory within a computer system. Some programming languages require explicit manual deallocation of previously allocated memory, which may be complicated and prone to error. Languages which require explicit manual memory management include the C and C++ programming languages. Other programming languages utilize automatic storage-reclamation to reclaim memory that is no longer necessary to ensure the proper operation of computer programs which allocate memory from the reclamation system. Such automatic storage-reclamation systems reclaim memory without explicit instructions or calls from computer programs which were previously utilizing the memory.

In object-oriented or object-based systems, the typical unit of memory allocation is commonly referred to as an object or a memory object, as will be appreciated by those skilled in the art. Objects which are in use are generally referred to as "live" objects, whereas objects which are no longer needed to correctly execute computer programs are typically referred to a "garbage" objects. The act of reclaiming garbage objects is commonly referred to as garbage collection, while an automatic storage-reclamation system is often referred to as a garbage collector. Computer programs which use automatic storage-reclamation systems are known as mutators due to the fact that such computer programs can change live memory objects during execution. Computer programs written in languages such as the Java™ programming language (developed by Sun Microsystems, Inc. of Palo Alto, Calif.) and the Smalltalk programming language use garbage collection to automatically manage memory.

Objects typically contain references to other objects. As such, an area of computer memory which is managed by a garbage collector will generally contain a set of objects which reference one another. FIG. 1 is a diagrammatic representation of an area of computer memory which contains objects. A managed area of memory 10, which is typically a heap associated with a computer system, includes objects 20. In general, an object 20 may be referenced by other objects 20. By way of example, object 20a has a pointer 24a to object 20b. Object 20c also has a pointer 24b to object 20b. As such, object 20b is referenced by both objects 20a and 20c.

A number of external references into memory 10. As shown, a fixed root 30 which is external to memory 10 includes pointers 34 to objects, e.g., objects 20a and 20c, located in memory 10. All objects, as for example objects 20a–d, which may be reachable by following references from fixed root 30 are considered to be live objects. Alternatively, object 20e, which is not reachable by following references from fixed root 30, is characterized as a garbage object.

Garbage collectors are typically implemented to identify garbage objects such as object 20e. In general, garbage collectors may operate using a number of different algorithms. Conventional garbage collection algorithms include reference counting collectors, mark sweep collectors, and copying collectors, as described in *Garbage Collection: Algorithms for Automatic Dynamic Memory Management* by Richard Jones and Rafael Lins (John Wiley & Sons Ltd., 1996), which is incorporated herein by reference in its entirety. As will be appreciated by those skilled in the art, during garbage collection, when objects 20 are moved, references to objects 20 must be adjusted accordingly.

It is often beneficial to separate a managed memory area into smaller sections to enable garbage collection to be preformed locally in one area at a time. One memory partitioning scheme is generational garbage collection, in which objects are separated based upon their lifetimes as measured from the time the objects were created. Generational garbage collection is described in more detail in above-referenced *Garbage Collection: Algorithms for Automatic Dynamic Memory Management* by Richard Jones and Rafael Lins (John Wiley & Sons Ltd., 1996). "Younger" objects have been observed as being more likely to become garbage than "older" objects. As such, generational garbage collection may be used to increase the overall efficiency of memory reclamation.

FIG. 2 is a diagrammatic representation of an interface between a root and memory which is partitioned into a new generation and an old generation. A memory 110, which is typically a heap that is associated with a computer system, includes a new generation 110a and an old generation 110b. A fixed root 114, or a global object which references objects within either or both new generation 110a and old generation 110b, includes pointers 116 to objects 120 in new generation 110a, as shown. Root 114 may be located on a stack, as will be appreciated by those skilled in the art.

Some objects 120 within new generation 110a, as for example object 120a, may also be considered as roots, since object 120a is assumed to be live and includes a pointer 122 to another object 120d. When new generation object 126 is live and to old generation object 128, garbage collection performed in old generation 110b does not generally "collect" object 128. However, if new generation object 126 is dead, a garbage collection performed in new generation 110a will result in old generation object 128 becoming unreachable, since old generation object 128 will not be pointed to by any other object. If old generation object 128 is unreachable, then garbage collection performed in old generation 110b will result in the collection of old generation object 128. It should be appreciated that pointer 130, which points between new generation object 126 and old generation object 128 is considered to be an intergenerational pointer, since pointer 130 spans both new generation 110a and old generation 110b. When pointer 130 points from new generation object 126 to old generation object 128, old generation object 128 is considered to be tenured garbage, as old generation object 128 is not collectable using new generation garbage collection.

Another memory partitioning scheme involves separating memory into smaller areas in order to reduce the amount of time required for a single garbage collection to be performed. Pauses caused by garbage collection often tend to disrupt an associated mutator and are, therefore, undesirable. In some systems, the garbage collector may be able to provide a guaranteed small maximum pause duration. Such garbage collectors associated are known as real-time garbage collectors. In other systems, the garbage collector may attempt to keep pause times small, but may fail to do so in some situations. Garbage collectors which attempt to keep pause times small are known as non-disruptive or incremental garbage collectors.

In order to operate on an individual memory area, a garbage collector must have knowledge of all references into that area. References into an area are referred to as roots for that area. It should be appreciated that roots may include both external references, e.g., fixed roots, and references from other areas of computer memory. Accordingly, garbage collectors generally provide mechanisms for finding and tracking roots, or references.

One method of locating references into a memory area involves scanning through all objects in memory. For most systems, scanning through all objects in memory is prohibitively time-consuming. As such, a more elaborate tracking scheme is often required.

Whenever a mutator stores a reference into an object, additional processing may be implemented in order to track references for garbage collection purposes. This additional processing is known as a write barrier or store check. In order for efficiency of the mutator to be maintained at an acceptable level, the costs associated with the write barrier must be kept as low as possible.

One way of tracking references into a memory area involves maintaining a set which holds all roots for the area. Such a set is generally known as a remembered set for the area, as is described in above-referenced *Garbage Collection: Algorithms for Automatic Dynamic Memory Management* by Richard Jones and Rafael Lins (John Wiley & Sons Ltd., 1996). The associated write barrier will detect when a reference into an area is stored. Accordingly, the write barrier will insert the location of the reference into the remembered set associated with the area.

FIG. 3 is a diagrammatic representation of pointers between objects in a new generation and objects in an old generation which are tracked using a remembered set. A memory 302 is divided into a new generation 302a and an old generation 302b. A remembered set 304 is used to track pointers 314 which point from old generation objects 310 to new generation objects 312. The address of old generation object 310a is stored in remembered set 304, as old generation object 310a includes pointer 314a to new generation object 312b. Similarly, the address of old generation object 310b, which includes pointers 314b and 314c to new generation objects 312b and 312a, respectively, is also stored in remembered set 304.

Locating roots for garbage collection is straightforward when a remembered set is used, since the remembered set will contain all of the roots. However, the use of a write barrier is often expensive, as excess memory may be required. Also, when a new location is to be inserted into a remembered set, it is possible that the particular location may already be present within the remembered set. Checking the remembered set for duplicate locations prior to inserting a location is expensive. On the other hand, eliminating a check for duplicate locations may cause the remembered set to grow unnecessarily large. As will be appreciated by those skilled in the art, there is generally no upper bound on the number of duplicates which a remembered set may hold. When a reference to a location is to be stored, the location often already contains a previous reference. As a result, a remembered set entry that is associated with the location prior to a storage operation will generally become invalid following the storage operation. Removing an old entry may prove to be a costly operation in some situations, whereas leaving an old entry in place may result the occupation of excess memory by a remembered set.

Another scheme which is often used for tracking references into a memory area is known as card marking. Card marking is described in above-referenced *Garbage Collection: Algorithms for Automatic Dynamic Memory Management* by Richard Jones and Rafael Lins (John Wiley & Sons Ltd., 1996). In general, card marking involves conceptually dividing memory into relatively small parts called cards. A garbage collector will then allocate an array of bits with one entry per card. When a reference is stored, the write barrier will compute the corresponding card array entry and set the associated bit. This process is known as "dirtying" the card. It should be appreciated that for efficiency reasons, a byte or a word array are often used in lieu of a bit array.

One advantage of using card marking is that the write barrier is relatively cheap, as described in *A Fast Write Barrier for Generational Garbage Collectors*, by Urs Hölzle (OOPSLA/ECOOP '93 Workshop on Garbage Collection in Object-Oriented Systems, October 1993), which is incorporated herein by reference in its entirety. Another advantage of using card marking is that the amount of memory required for the card array is fixed. However, the processing required for locating roots at garbage collection time is often significant, e.g., more processing is required than would be for a system which utilizes a remembered set. The garbage collector only knows approximately where reference stores have occurred. That is, the garbage collector only knows where the card marking array has dirty entries. Once a dirty entry is identified, the corresponding cards must be scanned for roots. Although scanning a card for roots is generally much cheaper than scanning an entire memory, scanning the card is still often costly. As will be understood by those skilled in the art, when a garbage collector locates a root, the corresponding card array entry must be kept dirty in order for the root to be located the next time garbage collection is invoked.

A combined scheme which uses remembered sets and card marking is described in *Remembered Sets Can Also Play Cards*, by Antony L. Hosking and Richard L. Hudson (OOPSLA/ECOOP '93 Workshop on Garbage Collection in Object-Oriented Systems, October 1993), which is incorporated herein by reference in its entirety. A write barrier will perform card marking as described above. However, at garbage collection time, the garbage collector will construct remembered sets for each card. When garbage collection is completed, the card marking array may then be cleared. Using a combined remembered set and card marking scheme reduces the amount of scanning required for subsequent garbage collections, thereby increasing the overall efficiency of garbage collection processes. However, the implementation of such schemes is often complicated. Therefore, what is desired is a method and an apparatus for efficiently implementing a combined remembered set and card marking scheme.

SUMMARY OF THE INVENTION

The present invention relates to methods and apparatus for performing generational garbage collection within computer memory. According to one aspect of the present invention, a computer-implemented method for dynamically managing memory which includes a first memory section and a second memory section that is divided into a plurality of blocks each having an associated marker, includes performing a first garbage collection on the first memory section. The method also includes performing a second garbage collection on a selected one of the blocks in the memory section. A third garbage collection is performed on the selected block in the second memory section. The third garbage collection includes determining whether the selected block includes a first object which references a second object which is not included in the selected block based at least in part on a status indicated by the marker associated with the selected block. The status includes an indication of whether the reference to the second object was stored after the second garbage collection was performed, and if the reference to the second object was stored after the second garbage collection was performed, a new root array is created using the selected marker.

In one embodiment, the method includes using the marker to identify whether the second object is in the first section using the marker, and when the second object is not in the first section, using the marker to identify whether the second object is in a second block of the second section. In such an embodiment, when the second object is not in the second block of the second section, the selected block is released. In another embodiment, the third garbage collection in the second section involves following a reference from a root associated with the second section. Following the reference from the root entails updating the marker to indicate whether the selected block includes the first object which references a second object that is not included in the selected block.

In accordance with another aspect of the present invention, a computer-implemented method for allocating a selected object in computer memory involves determining whether a first section of the memory is suitable for the selected object to be allocated, and allocating the selected object when it is determined that the first section is suitable for the object to be allocated. The method also involves performing a garbage collection in the first section when it is determined that the first section is not suitable for the selected object to be allocated. Performing the garbage collection in the first section includes scanning an array of words to locate a selected word that is arranged to indicate that a first root associated with the word references an object which already exists in the memory.

In one embodiment, when the selected word is located, performing the garbage collection in the first section further involves following associations of the first root. Following the associations of the first root includes updating the first root to a new location within the computer memory and updating the selected word accordingly. In such an embodiment, updating the selected word includes determining when the first root is in a second section of the memory and the existing object is in the first section. When it is determined that the first root is in the second section and that the existing object is in the first section, the selected word is updated to indicate that the first root is in the second section and the existing object is in the first section.

In accordance with still another aspect of the present invention, a computer system includes a memory arranged as a first memory section and a second memory section, where the second memory section is divided into a plurality of blocks. Such a computer system also includes a processor that is coupled to the memory, and a first garbage collector which is associated with the first memory section. A second garbage collector associated with the second memory section is arranged to perform a garbage collection on a selected block which has an associated marker that is arranged to indicate whether the selected block includes a first object which references a second object that is not included in the selected block. The selected markers is associated with a root arrays which hold address of the object when the object references the second object that is not in the selected block. In one embodiment, the second garbage collector is arranged to use the marker to identify whether the second object is in the first memory section.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which:

FIG 4a is a diagrammatic representation of an old generation memory which is segmented into trains in accordance with an embodiment of the present invention.

DETAILED DESCRIPTION OF THE EMBODIMENTS

Figure 1:
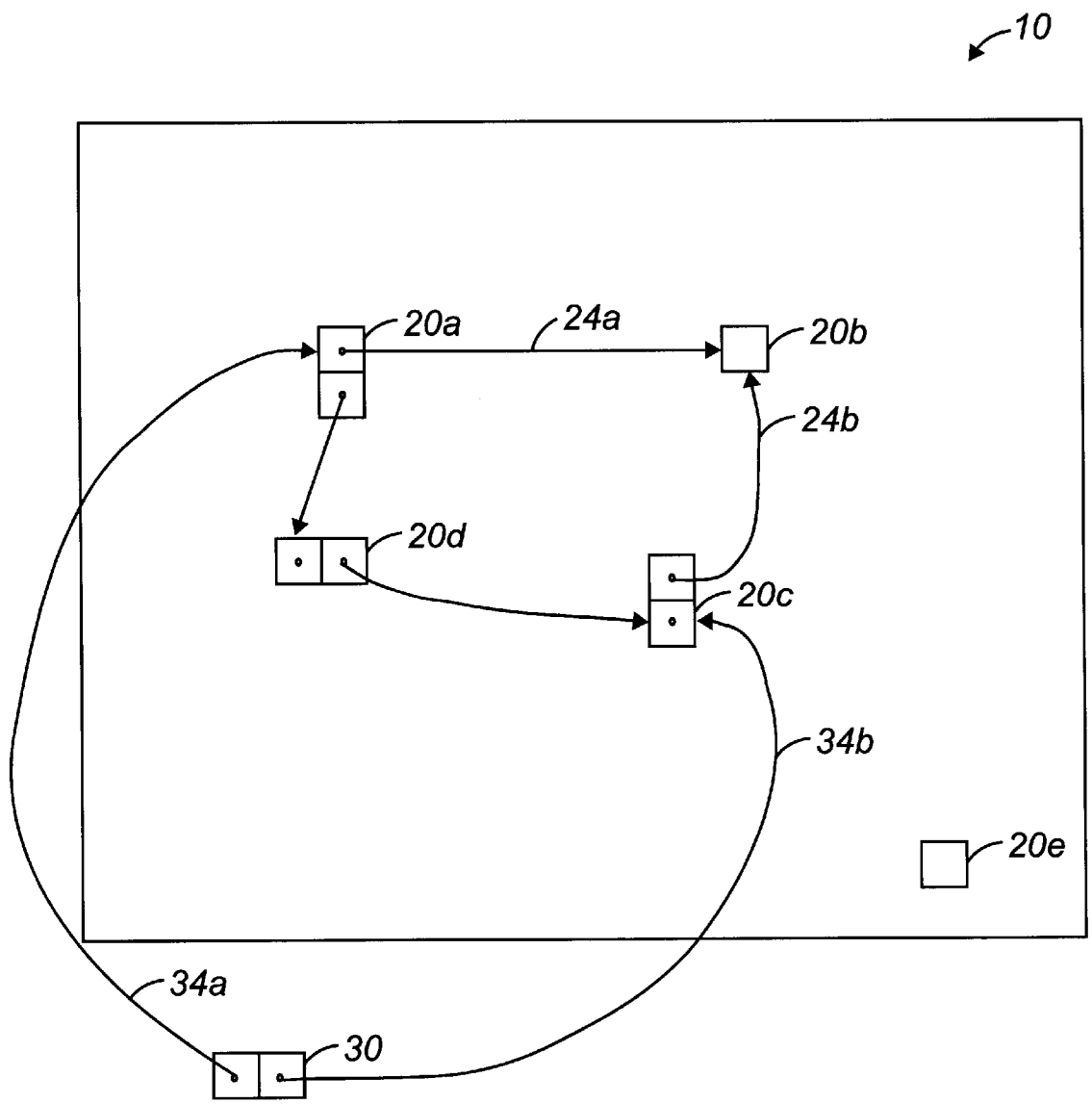
FIG. 1 is a diagrammatic representation of an area of computer memory which contains objects in accordance with prior art.
Figure 2:
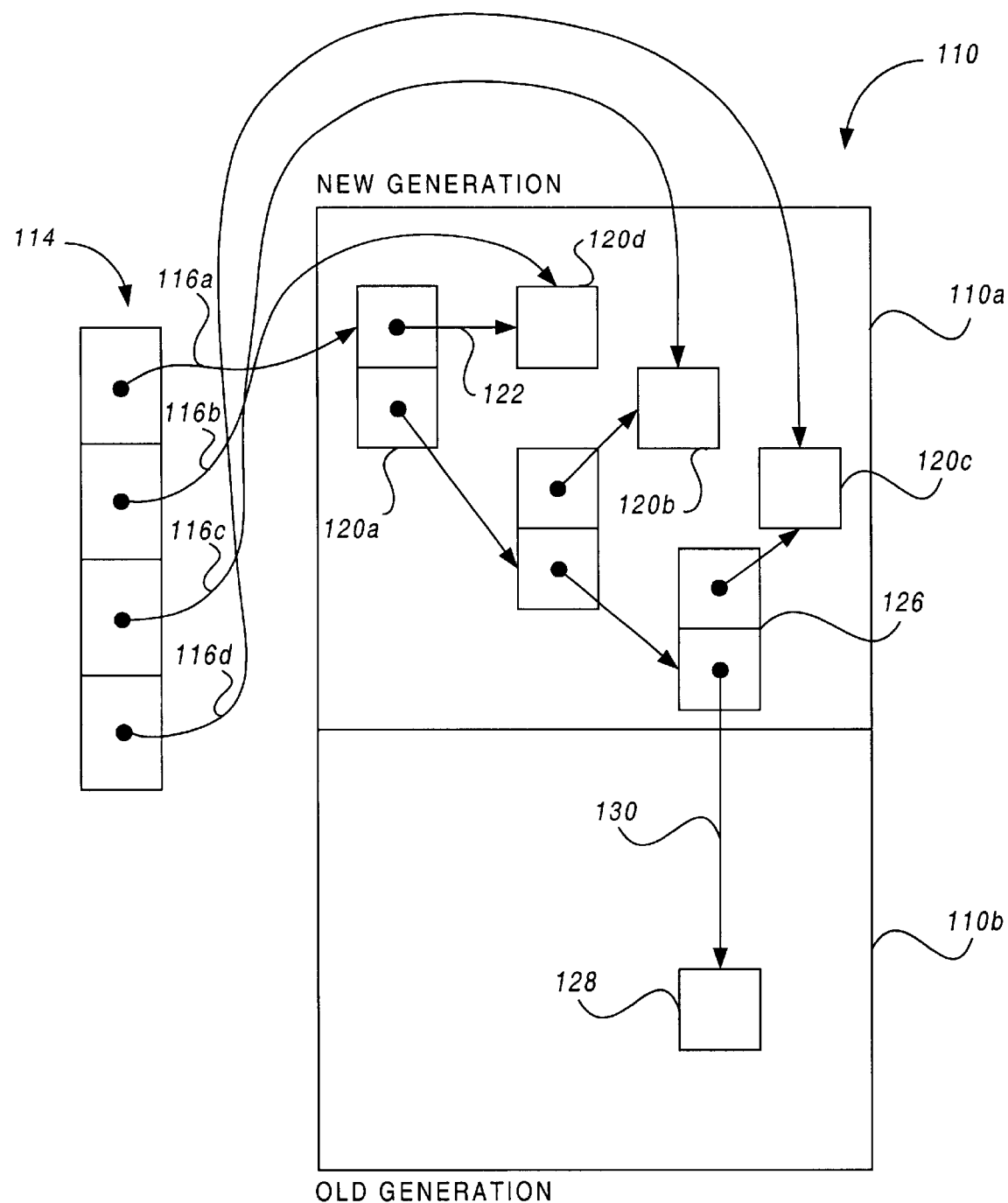
FIG. 2 is a diagrammatic representation of an interface between a root and memory which includes a new generation and an old generation in accordance with prior art.
Figure 3:
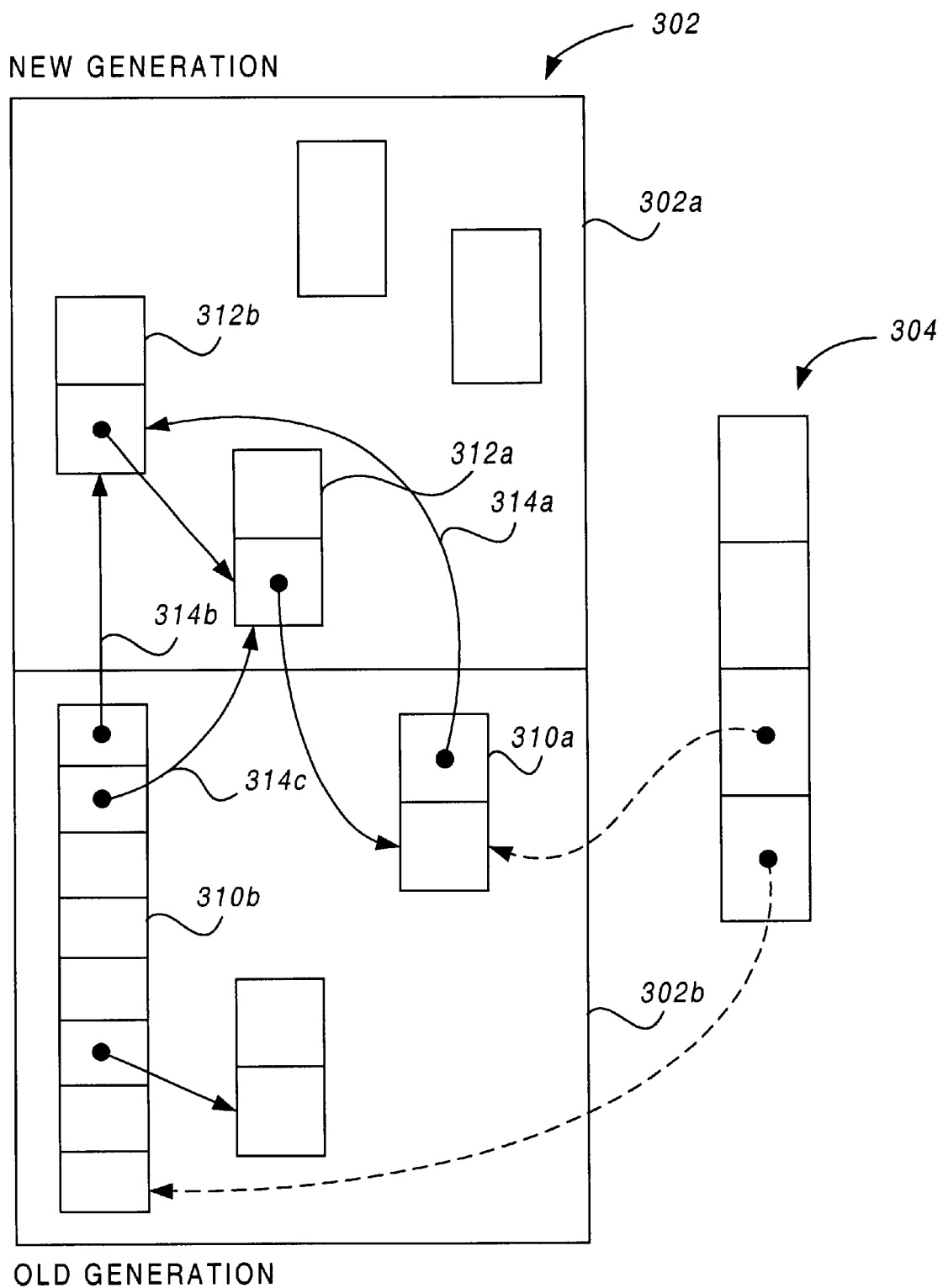
FIG. 3 is a diagrammatic representation of a memory which is associated with a remembered set in accordance with prior art.

Garbage collection is used to dynamically allocate computer memory for use by a computer program. In general, garbage collection causes pauses in the execution of the program. One apparatus for reducing the pause-times associated with garbage collection is to divide the memory into a plurality of generations. By way of example, in a two generation memory structure, the memory may be divided into a new generation, which includes newly allocated objects, and an old generation, which includes older objects. It should be appreciated that, newly allocated objects tend to die more quickly than older objects. As such, garbage collection may be performed more often in the new generation than in the old generation. Typically, the new generation is relatively small compared to the overall size of the memory. Accordingly, garbage collection within the new generation may typically be performed without causing substantial interruptions during the execution of a program.

While garbage collection in the new generation may not result in significant pause-times, garbage collection in the old generation may still cause significant pauses during the execution of a program, since the old generation is typically larger than the new generation. Further, if inter-generational pointers from objects in the old generation to objects in the new generation exist, then the inter-generational pointers are often tracked while a program executes. The inter-generational pointers are tracked since objects in the old generation that are associated with such pointers are considered to be roots of the new generation. The tracking of the pointers, or references, from objects in the old generation to objects in the new generation is often complicated and, therefore, time-consuming.

By dividing old generation memory into smaller areas, or blocks, pause-times associated with old generation garbage collection may be reduced. Old generation garbage collection may be performed in a specific block of old generation memory each time old generation garbage collection is performed. By limiting the blocks in which old generation garbage collection is performed, and by collecting garbage in different blocks each time old generation garbage collection is performed, the efficiency of the old generation garbage collection may be enhanced.

As previously mentioned, old generation memory is divided into blocks to facilitate old generation garbage collection. Each time old generation garbage collection is performed, the old generation garbage collection is performed on any suitable block. That is, old generation garbage collection may be performed incrementally. In one embodiment, garbage collection may be performed on the oldest block in which garbage collection has not been performed. In another embodiment, garbage collection may be performed on the block in which garbage collection has been performed least recently.

With reference to FIG. 4a, the division of memory into blocks within an old generation will be described in accordance with an embodiment of the present invention. An old generation 404 includes blocks 408 of memory. The blocks of memory are typically allocated on an as-needed basis. That is, additional blocks are allocated when substantially all existing blocks 408 are fill. Blocks 408, which contain objects associated with a particular program, are often referred to as "cars." Blocks or cars 408 are arranged in linked sets which are known as "trains" 412. For example, train 412a includes cars 408a, 408b, while train 412b includes cars 408c, 408d, 408e, and train 412c includes cars 408f and 408g.

Cars 408 within trains 412 are generally ordered based upon when a particular car 408 was added to a particular train 412. For example, within train 412a, if car 408b is added to train 412a after car 408a, car 408a is considered to be a lower car in the same train as car 408b. Similarly, trains 412 are generally also ordered based when a particular train 412 is created. As shown, if train 412b is added to memory 404 after train 412c, then train 412c is a lower train with respect to train 412b and, therefore, cars 408c, 408d, 408e, within train 412b.

An algorithm which uses trains 412 to perform garbage collection within old generation 404 typically collects a set number of cars 408 at a time. One algorithm which uses trains 412 to perform garbage collection is described in *Incremental Mature Garbage Collection Using the Train Algorithm* by Jacob Seligmann and Steffen Grarup (ECOOP 1995) which is incorporated herein by reference. In the described embodiment, only a single car 408 is collected during each old generation garbage collection, although it should be appreciated that any suitable number of cars may be collected during each old generation garbage collection. By collecting one car 408 at a time, the overall length of old generation garbage collection, and, therefore, the pause-times associated with old generation garbage collection is essentially bounded. Hence, the lengthy pause-times that are typically associated with old generation garbage collection may be reduced by collecting only a set number of cars 408 during each old generation garbage collection.

In general, in order to perform garbage collection in cars 408, all pointers which either originate in, or access objects within, each car 408 in old generation memory are tracked. One method for tracking pointers will be described below with respect to FIG. 4b. When a particular car 408 which is to be collected includes a live object, the object is copied into a train 412 which either points to or is pointed to by the object. Then, once the copy of the object is made, the "original" object is collected or reclaimed. In general, when a selected train 412 no longer has pointers outside of itself, the selected train 412 may be eliminated, i.e., the memory allocated to the selected train 412 is freed. Similarly, when a selected car 408 no longer has pointers outside of itself, the selected car 408 may be eliminated.

In the described embodiment, the size of cars 408 within a given train 412 is fixed. That is, all cars 408 may be of substantially of the same size. Therefore, since a single car 408 may not have enough space to accommodate linked objects, an object 416a in one car 408, e.g., car 408f, may be linked to an object 416b in a second car 408, e.g., car 408g. During an old generation garbage collection, objects 416a, 416b are likely to survive, since objects 416a, 416b are in separate cars 408, and reference each other. As such, an old generation garbage collection may not result in the collection of cars 408f, 408g. Hence, memory associated with cars 408f, 408g will not generally be freed unless pointers between cars 408f, 408g within train 412c are tracked.

In general, the length of trains 412, as well as the size of cars 408 may be widely varied. The size of cars 408 may depend on factors which include, but are not limited to, the size of old generation 404, the speed of the garbage collection algorithm, and the speed of the computer running the garbage collection algorithm. By way of example, car sizes on the order of approximately 20 kilobytes of memory to approximately 100 kilobytes of memory work well in current systems. In the described embodiment, cars 408 include approximately 64 kilobytes of memory.

Figure 4B:
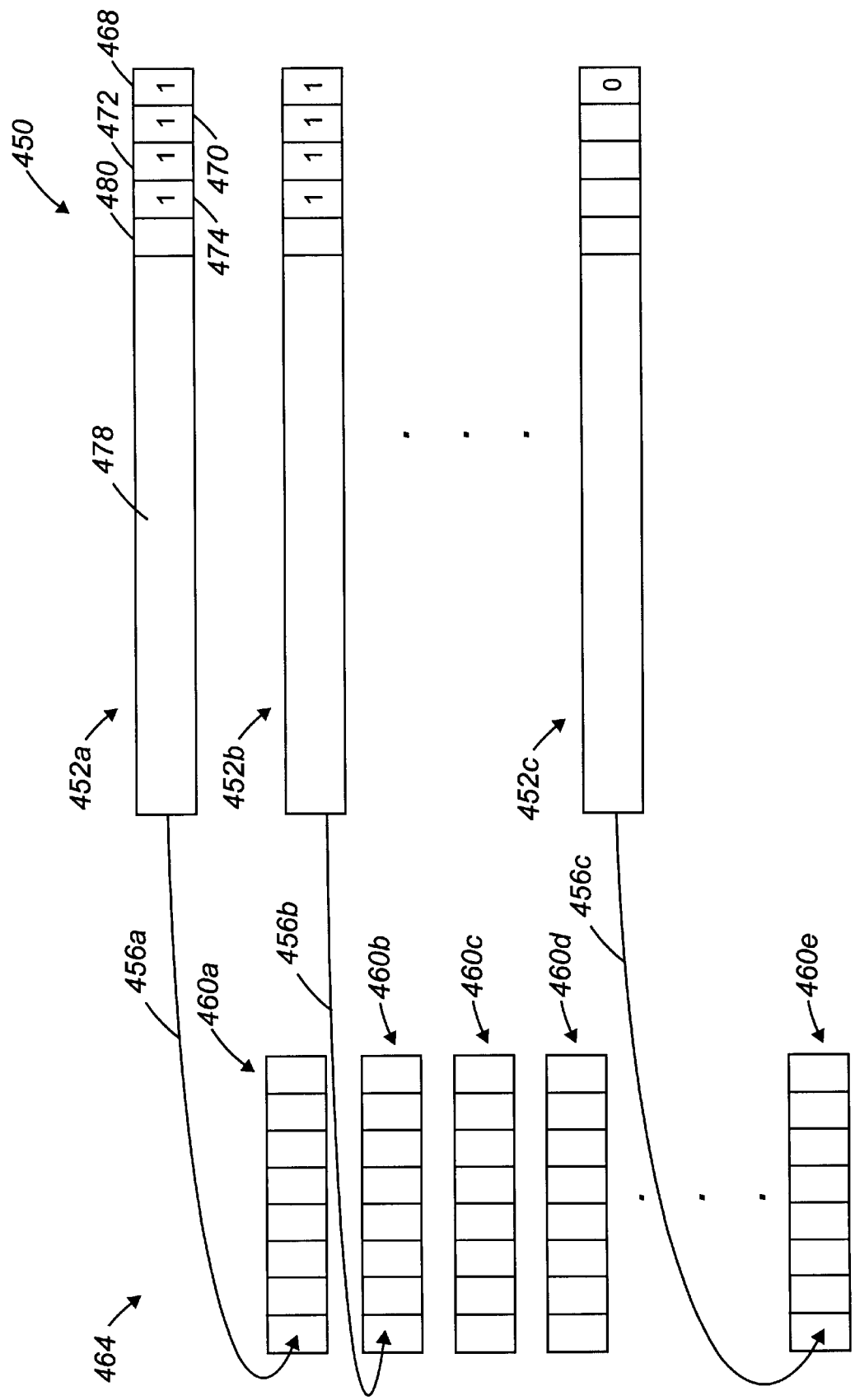
FIG. 4b is a diagrammatic representation of an array of card marks and an associated pool of root arrays in accordance with an embodiment of the present invention.

Cars 408 may generally be divided into cards 420 which may be used to facilitate old generation garbage collection performed on cars 408, as will be described below with respect to FIG. 4b. Cards 420, like cars 408, may take on any suitable size, although cards 420 may often include approximately 100 to approximately 1000 bytes. For example, for cars 408 which include approximately 64 kilobytes of memory, cards 420 may include approximately 512 bytes.

The efficiency of tracking inter-generational pointers which point from old generation objects to new generation objects may be improved by providing storage, or markers, that are associated with the different areas within the old generation. In one embodiment, a marker is a word that may include a flag which is set to indicate whether an associated portion of a particular area includes a pointer into an object in the new generation. The use of such words provides an efficient structure which may be used to track inter-generational pointers from objects in the old generation to objects in the new generation. Although a marker is described as being a word, it should be appreciated that a marker may be any suitable storage type, as for example bits, bytes, and the like.

In order to track inter-generational pointers from objects associated with cards in old generation memory to objects in new generation memory, cards may be provided with "tracking structures." The tracking structures, or card marks, may be used to identify whether inter-generational pointers exist for a card, and also which objects within the card include the pointers. FIG. 4b is a diagrammatic representation of an array of card marks and an associated pool of root arrays in accordance with an embodiment of the present invention. A root array is generally a small array which contains root locations which are specified as offsets relative to a card. In other words, a root array is essentially a small, remembered set. An array 450 of card marks 452 includes pointers 456 to root arrays 460 contained in a pool 464 of root arrays 460. Card marks 452 are generally associated with a car within a train. Specifically, a car within a train may be divided into a number of cards that hold old generation objects. As such, a car within a train may be associated with many card marks 452. A grouping of card marks 452, which may or may not include all card marks 452 associated with a car, is considered to be an array 450 of card marks 452. In the described embodiment, array 450 includes all card marks 452 associated with the old generation.

In the described embodiment, a card mark 452, as for example card mark 452a, is a 32-bit word, although it should be appreciated that card mark 452a may generally be a word of any suitable length. Alternatively, the data structure that constitutes the card mark may be divided into a number of components. Although the bits which make up card mark 452a may be assigned in any manner that is appropriate to a particular application, in one embodiment, the lowest bits, or least significant bits, of card mark 452a are used as flags which essentially identify the "status," or overall condition, of card mark 452a. A lowest bit 468 of card mark 452a is a "dirty " flag. That is, lowest bit 468 is generally arranged to indicate whether card mark 452a or, more specifically, a card (as shown in FIG. 4a) associated with card mark 452a, is "dirty." Dirty cards are cards where pointers have been stored since the last garbage collection. Such pointers may include, but are not limited to, an inter-generational pointer which points from old generation memory into new generation memory, a pointer to a lower train, and a pointer to a lower car in the same train that is associated with card mark 452a. When lowest bit 468 is set, i.e., when lowest bit 468 is set to "0," the indication is that card mark 452a is dirty.

A second lowest bit 470 of card mark 452a is a new generation flag, and is used to indicate whether card mark 452a includes an inter-generational pointer to a new generation. When second lowest bit 470 is set, i.e., set to "0", the indication is that card mark 452a includes an inter-generational pointer to a new generation. A third lowest bit 472 is a lower train flag in the described embodiment. The lower train flag is arranged to indicate whether card mark 452a has a pointer into a lower train. When the lower train flag, or third lowest bit 472, is set, the indication is that card mark 452a includes a pointer into a lower train. A fourth lowest bit 474 is a same train flag that is arranged to indicate whether card mark 452a includes a pointer into a lower car in the same train.

In the described embodiment, in order for card mark 452a to be considered clean, card mark 452a generally may not include a pointer which points from an old generation to a new generation, a pointer into a lower train, or a pointer into a lower car of the same train. As such, lowest bit 468, second lowest bit 470, third lowest bit 472, and fourth lowest bit 474 all have values of "1" in the event that card mark 452a is clean. In other words, the lowest four bits of card mark 452a are cleared when card mark 452a is clean. Therefore, as shown, card marks 452a, 452b are clean, whereas card mark 452c, which has a lowest bit that is set, is dirty.

The remaining twenty-eight bits in card mark 452a may all be allocated for use as a pointer that points to an associated root array 460 which essentially holds addresses of pointers associated with card mark 452a. Alternatively, as for example in the described embodiment, card mark 452a includes a 27-bit pointer 478 and a reserved bit 480. 27-bit pointer 478 identifies pointer 456a which points from card mark 452a into root array 460a. Root array 460a is often either made up of eight words or sixteen words, although the number of words in root array 460a may be widely varied. Root arrays 460 are generally arranged to hold references to roots. By way of example, root array 460a holds roots associated with card mark 450a and, hence, a card (as shown in FIG. 4a) that is associated with card mark 450a.

When a suitable root array 460 is full, then a "root array overflow" is said to occur. When too many roots are to be stored in a given root array 460, the roots are no longer tracked. A root array overflow generally occurs when the volume of pointers to root arrays 460 in pool 464 is excessive with respect to the root arrays 460 available for allocation in pool 464. As a result, when performing garbage collection, the pointers in with the card associated with the root array overflow are then typically searched to identify roots. When a root array overflow occurs, 27-bit pointer 478 is set to null. That is, the twenty-seven bits in 27-bit pointer 478 are set to "0."

Reserved bit 480 may be used for any number of suitable purposes which may or may not be directly related to garbage collection processes. Suitable purposes include, but are not limited to, using reserved bit 480 to indicate the age of card mark 452a. It should be appreciated that additional reserved bits may also be included in card mark 452a by reducing the number of bits associated with the pointer in card mark 452a, e.g., 27-bit pointer 478.

Card marks are used in conjunction with a garbage collection process to track cards within a car which include inter-generational pointers to objects in a new generation. In one embodiment, during the execution- of a computer program, the card marks may be updated to enable the card marks to remain substantially current. Then, during a garbage collection, the card marks may be checked to identify cards with inter-generational pointers.

Figure 5:
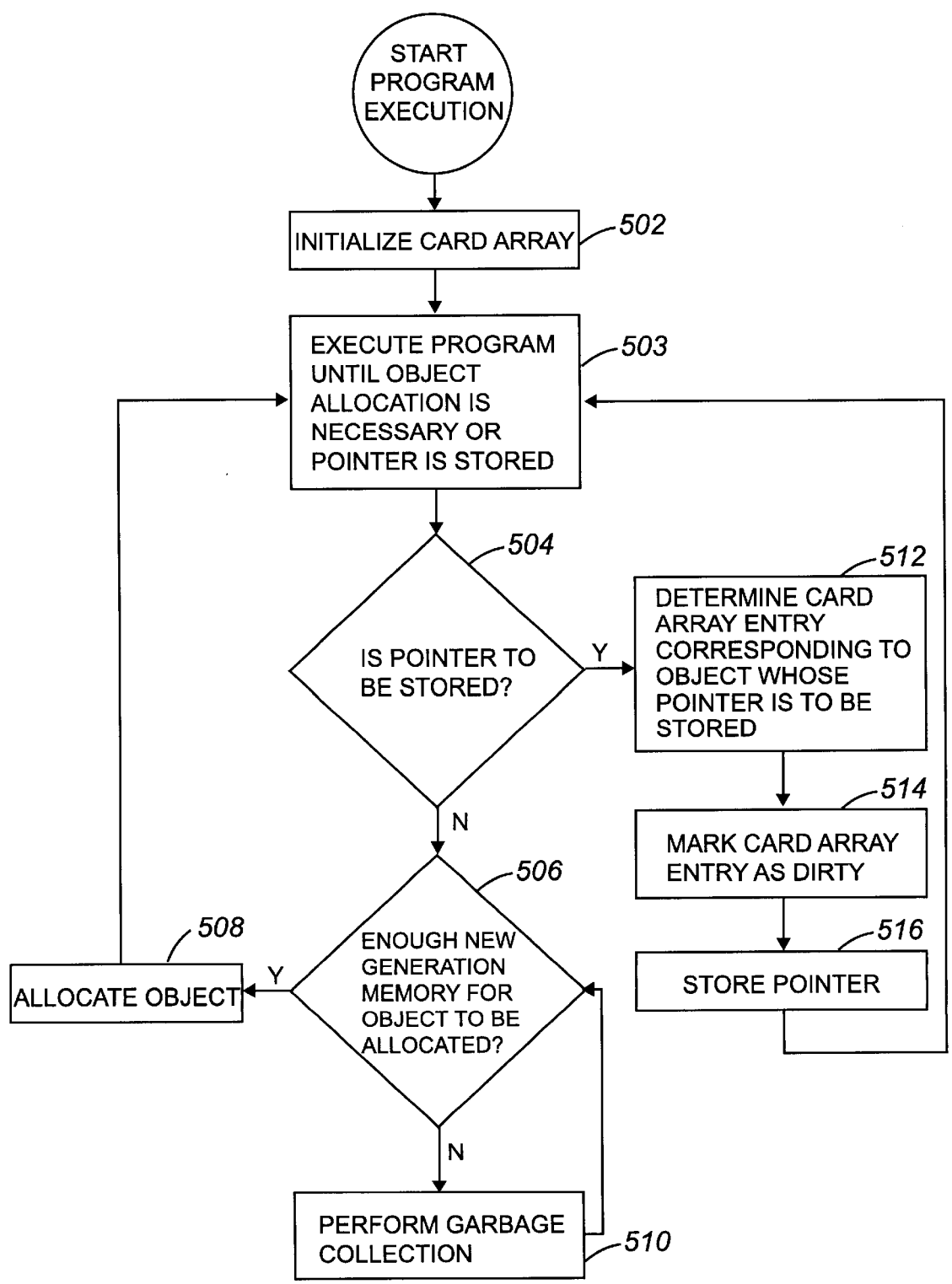
FIG. 5 is a process flow diagram which illustrates the steps associated with executing a computer program in accordance with an embodiment of the present invention.

When card marks are used to facilitate a garbage collection process during the execution of a computer program, the card marks are generally both searched and updated to identify objects referenced by the card marks. Referring next to FIG. 5, the steps associated with executing a program which uses garbage collection will be described in accordance with an embodiment of the present invention. Prior to executing a program, a card array that is associated with the program is initialized in step 502. IN one embodiment, a card array, which is associated with a car, includes card marks, or references to card marks, associated with objects used by a program, as mentioned above with respect to FIG. 4b. As such, a card array is generally used to track objects used in the program. After the card array is initialized, the program is executed in step 503 until it is desired either to allocate an object or to store a pointer for an object. Allocating an object generally involves assigning memory to an object, whereas storing a pointer for an object involves storing a pointer to another object within a first object.

During execution, there will periodically be instructions to store a pointer. When a pointer is to be stored, as represented by step 504, in step 512, an entry in the card array which corresponds to the object whose pointer is to be stored is identified. Once the card array entry is identified, the card array entry is marked as dirty in step 514. Marking the card array entry, i.e., card mark, as dirty involves setting the dirty flag of the entry, i.e., lowest bit 468 of entry 452a as was described above with respect to FIG. 4b. After the card mark is marked as dirty, the pointer is stored in step 516 using any suitable method. Identifying the card array entry and marking the card mark as dirty may be accomplished using Hölzle's write-barrier method, which is described in *Garbage Collection: Algorithms for Automatic Dynamic Memory Management* by Richard Jones and Rafael Lins (John Wiley & Sons Ltd., 1996) which is incorporated herein by reference. Once the pointer is written, process flow returns to step 503 where the program continues to execute. When the program terminates, any re-execution of the program will begin again at step 502 where an array of card marks is initialized.

Execution also generally provides instructions to allocate an object. In one embodiment, returning to step 504, when an object is to be allocated, a determination is made in step 506 as to whether enough new generation memory is in existence for the object to be allocated. If it is determined in step 506 that there is enough new generation memory for use in allocating an object, then an object is allocated in step 508, and process flow returns to step 503 where a determination is made regarding whether there is a pointer to be stored.

If the determination in step 506 is that there is insufficient new generation memory for an object to be allocated, then process flow proceeds to step 510 where garbage collection is performed. During garbage collection, new generation memory, and possibly old generation memory, may be cleaned to release sections of new generation memory such that an object may be allocated. Although it should be appreciated that any suitable garbage collection method may be used, one particularly suitable garbage collection method will be described below with respect to FIG. 6. After garbage collection is performed in step 510, process flow returns to step 506 where a determination is made regarding whether garbage collection has provided enough new generation memory for an object, i e., the object whose allocation was deemed necessary in step 503, to be allocated.

Figure 6:
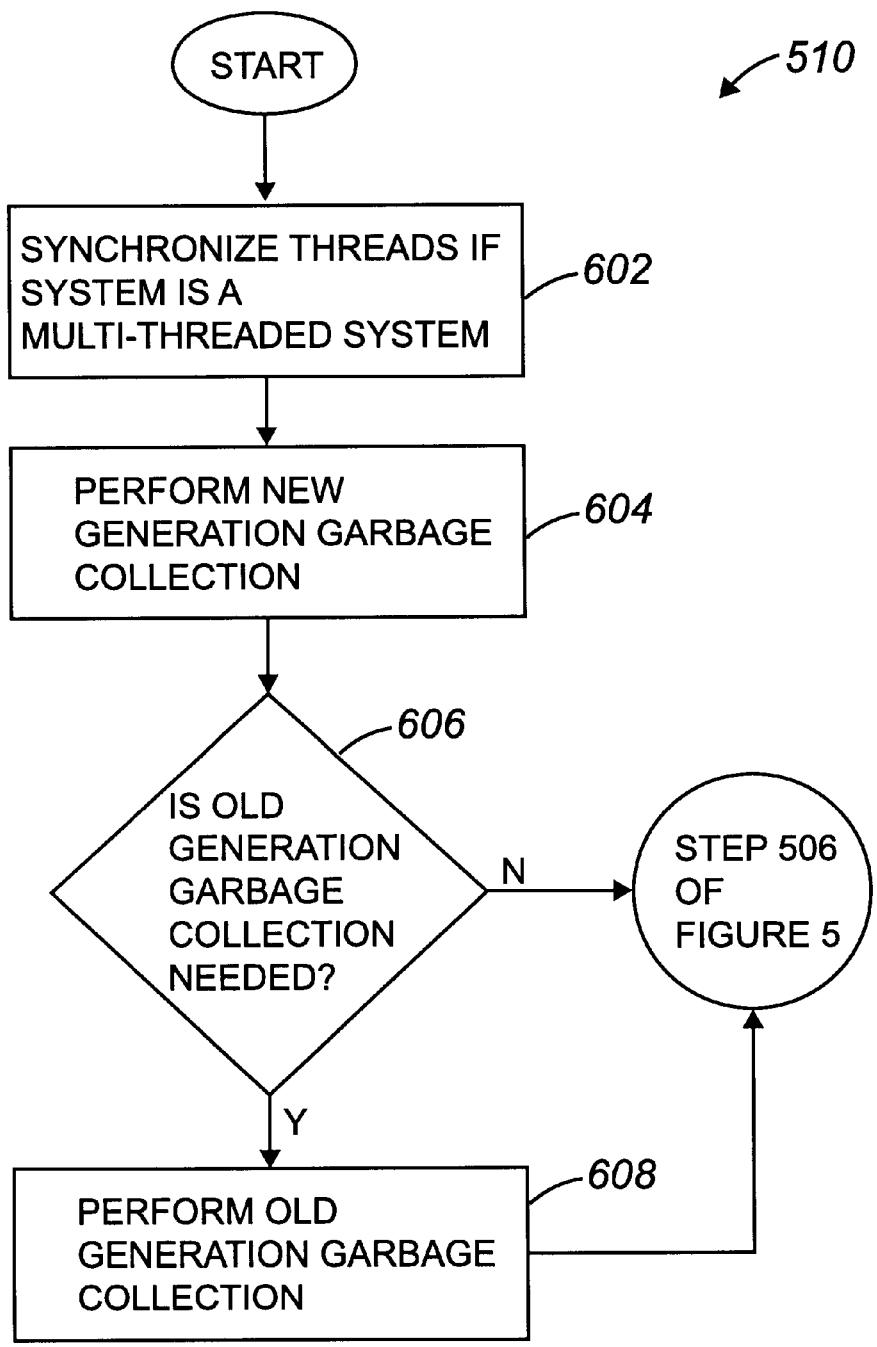
FIG. 6 is a process flow diagram which illustrates a process of performing a garbage collection, i.e., step 510 of FIG. 5, in accordance with an embodiment of the present invention.

With reference to FIG. 6, the steps associated with performing garbage collection will be described in accordance with an embodiment of the present invention. That is, step 510 of FIG. 5 will be described. Garbage collection may be performed in both new generation memory and old generation memory to "free up" enough memory space to enable an object to be allocated. If the system on which garbage collection is to be performed is a multi-threaded system, then the threads are synchronized in step 602 using any suitable method. Once any threads which require synchronization are synchronized, garbage collection is performed within the new generation memory in step 604. The steps associated with one method of performing such a new generation garbage collection will be described below with reference to FIG. 7a.

After the new generation garbage collection is performed in step 604, process flow proceeds to step 606 where a determination is made regarding whether it is necessary to perform garbage collection for old generation memory. In the described embodiment, old generation garbage collection is performed periodically. That is, after predetermined amounts of time have elapsed, old generation garbage collection is performed. In other embodiments, however, different or additional criteria may be used in the determination of whether old generation garbage collection is needed.

If it is determined that old generation garbage collection is needed, then old generation garbage collection using a card marking scheme is performed in step 608. Although methods associated with garbage collection performed on old generation memory using a card marking scheme may be widely varied, one suitable old generation garbage collection method will be described below with respect to FIGS. 8a and 8b.

Once old generation garbage collection is completed in step 608, the overall process of performing garbage collection to enable an object to be allocated is completed. Therefore, process flow proceeds to step 506 of FIG. 5, which is the determination of whether enough new generation memory is available for an object to be allocated. Similarly, if the determination in step 606 is that no old generation garbage collection is needed, process flow also proceeds to step 506 of FIG. 5.

Figure 7A:
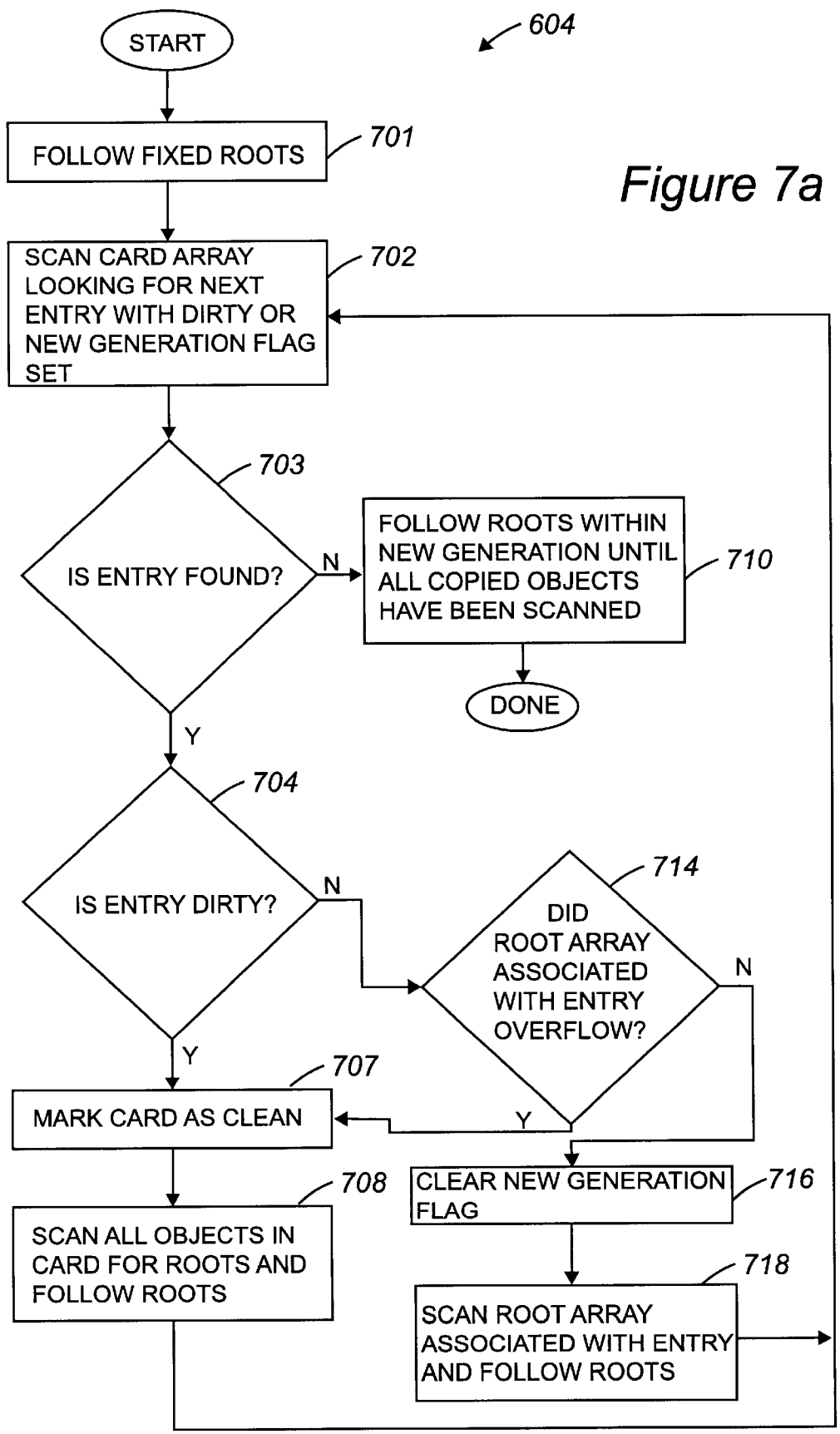
FIG. 7a is a process flow diagram which illustrates the steps associated with a garbage collection in new generation memory, i.e., step 604 of FIG. 6, in accordance with an embodiment of the present invention.

FIG. 7a is a process flow diagram which illustrates the steps associated with a new generation garbage collection, i.e., step 604 of FIG. 6, in accordance with an embodiment of the present invention. In step 701, fixed roots are followed. As previously mentioned, fixed roots are roots, e.g., live objects on a stack, which directly point into the new generation memory or the old generation memory which is being cleaned through garbage collection. Following fixed roots typically entails transitively following references of-the roots. The actual steps associated with following roots, fixed or otherwise, will be described below with respect to FIGS. 7b–7e.

After the fixed roots are followed, the card array is scanned in step 702 to locate the next entry in the card array with either or both a dirty flag or a new generation flag that is set. As previously described, in one embodiment, "setting" a bit refers to assigning a value of "0" the bit, whereas "clearing" a bit refers to assigning a value of "1" the bit. In step 703, a determination is made regarding whether an entry, or a card mark, with either or both a new generation flag or a dirty flag that is set has been found. If such an entry has been found, then process flow proceeds to step 704 where it is determined whether the entry is dirty.

If the determination in step 704 is that the entry is dirty, then the card associated with the entry is marked as clean in step 707. It should be appreciated that marking a card as clean implies marking the card mark associated with the card as clean. After the card is marked as clean in step 707, process flow proceeds to step 708 where all objects in the card are scanned to locate roots which are then followed. As previously mentioned, the steps associated with following the roots will be discussed with reference to FIGS. 7b–7e below. Once the roots are followed, process flow returns to step 702 where the card array is scanned to locate the next entry, i.e., card mark, with either or both a dirty flag or a new generation flag that is set.

If the determination in step 704 is that the entry is not dirty, then the entry has a new generation flag that is set. In other words, the entry includes an inter-generational pointer. If the entry is not dirty, process flow moves from step 704 to step 706 where a determination is made regarding whether the root array associated with the entry has overflowed. An overflowed root array is a root array which does not have include enough space to accept the insertion of an additional root. If it is determined that the root array associated with the entry is overflowed, then process flow moves to step 707 where the card associated with the entry is marked as clean.

From step 714, process flow moves to step 718 in which the block associated with the entry is scanned, and the roots associated with the block are followed. Then, process flow returns to step 702, which is the step of scanning the card array to look for the next entry in the card array with the lowest bit set to zero.

When a suitable entry, that is, an entry with the lowest bit set to zero, is not found in step 703, then the roots within the new generation memory are followed until all copied objects have been scanned in step 710. Once all copied objects have been scanned, the new generation garbage collection process is completed.

Figure 7B:
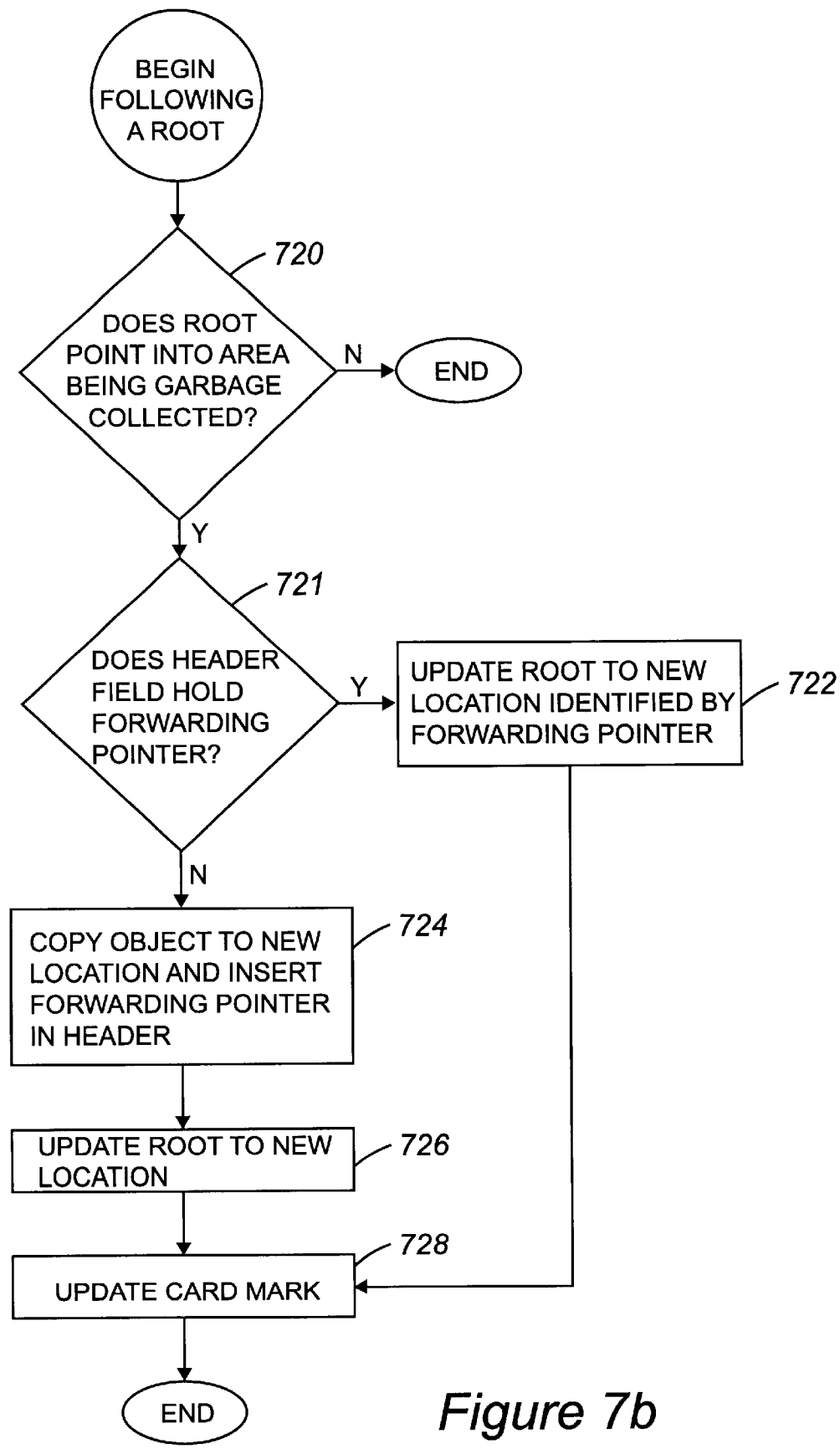
FIG. 7b is a process flow diagram which illustrates the steps associated with following a single root in accordance with an embodiment of the present invention.

In general, garbage collection involves following roots, as previously mentioned. Referring next to FIG. 7b, the steps associated with following a single root will be described in accordance with an embodiment of the present invention. The process begins with a determination in step 720 of whether the root points into a memory area in which garbage collection is occurring. If it is determined that the root does not point into an area that is being garbage collected, then the process of following the root is completed. On the other hand, if the determination in step 720 is that the root does indeed point into an area in which garbage collection is occurring, then, in step 721, a determination is made as to whether the header field of the card mark holds a forwarding pointer. That is, a determination is made regarding whether a new memory location is identified by a forwarding pointer associated with the card mark.

If the determination is that the header field does hold a forwarding pointer, then process flow moves from step 721 to step 722 where the root is updated to the new location identified by the forwarding counter. After the root is updated, the card mark is updated accordingly in step 728. The steps associated with updating a card mark will be described below with reference to FIG. 7c. Once the card mark is updated, then the process of following a root is completed.

Returning to step 721, if it is determined that the header field does not hold a forwarding pointer, then the object identified by the root is copied to a new location, and a forwarding pointer is inserted in the header of the object in step 724. The forwarding pointer identifies the new location of the object. When the forwarding pointer has been inserted in the header, the root is updated to the new location in step 726. Then, in step 728, the associated card marking is updated, and the process of following a root is completed.

Figure 7C:
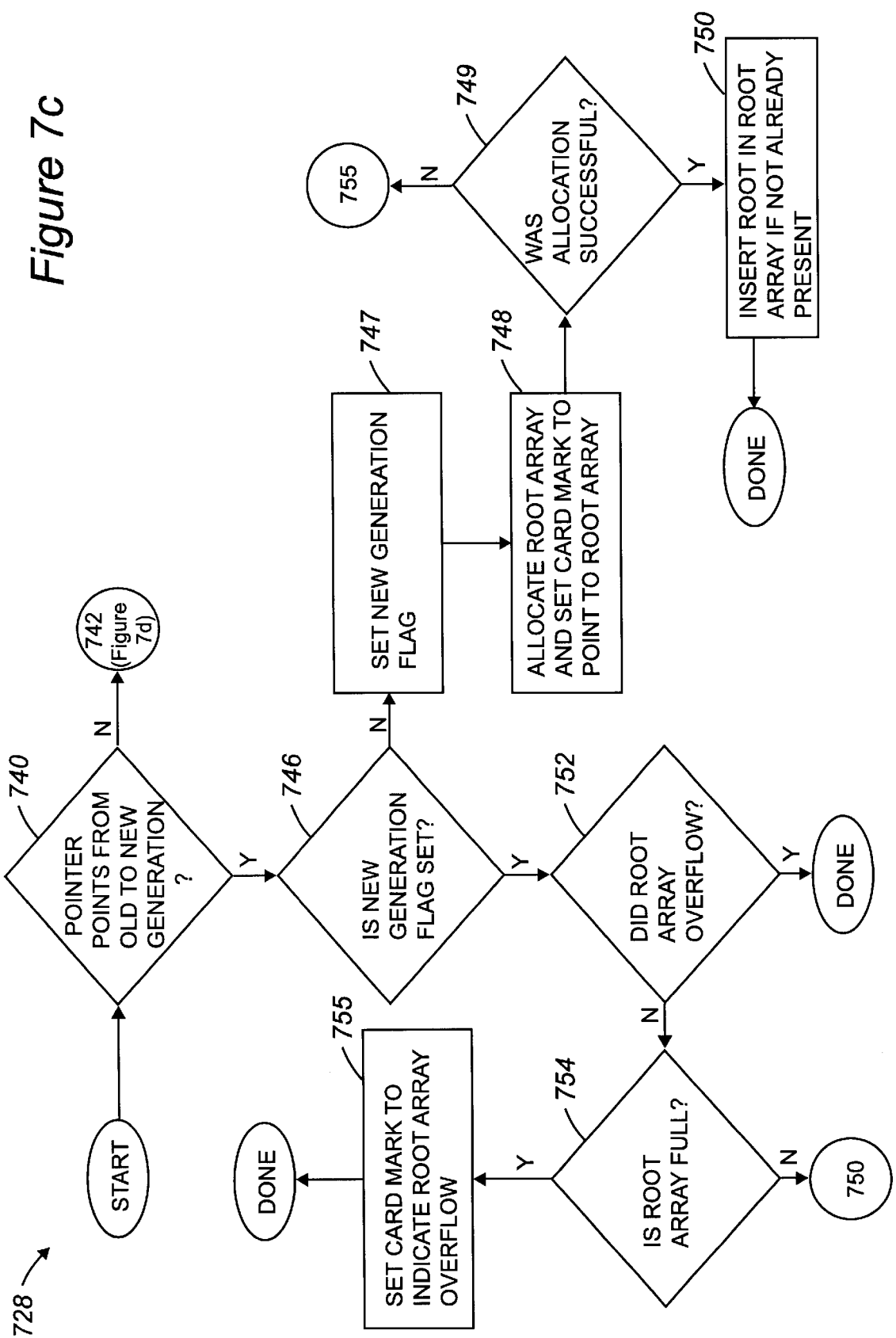
FIGS. 7c–7e are a process flow diagram which illustrates the steps associated with updating a card mark, i.e., step 728 of FIG. 7b, in accordance with an embodiment of the present invention.
Figure 7D:
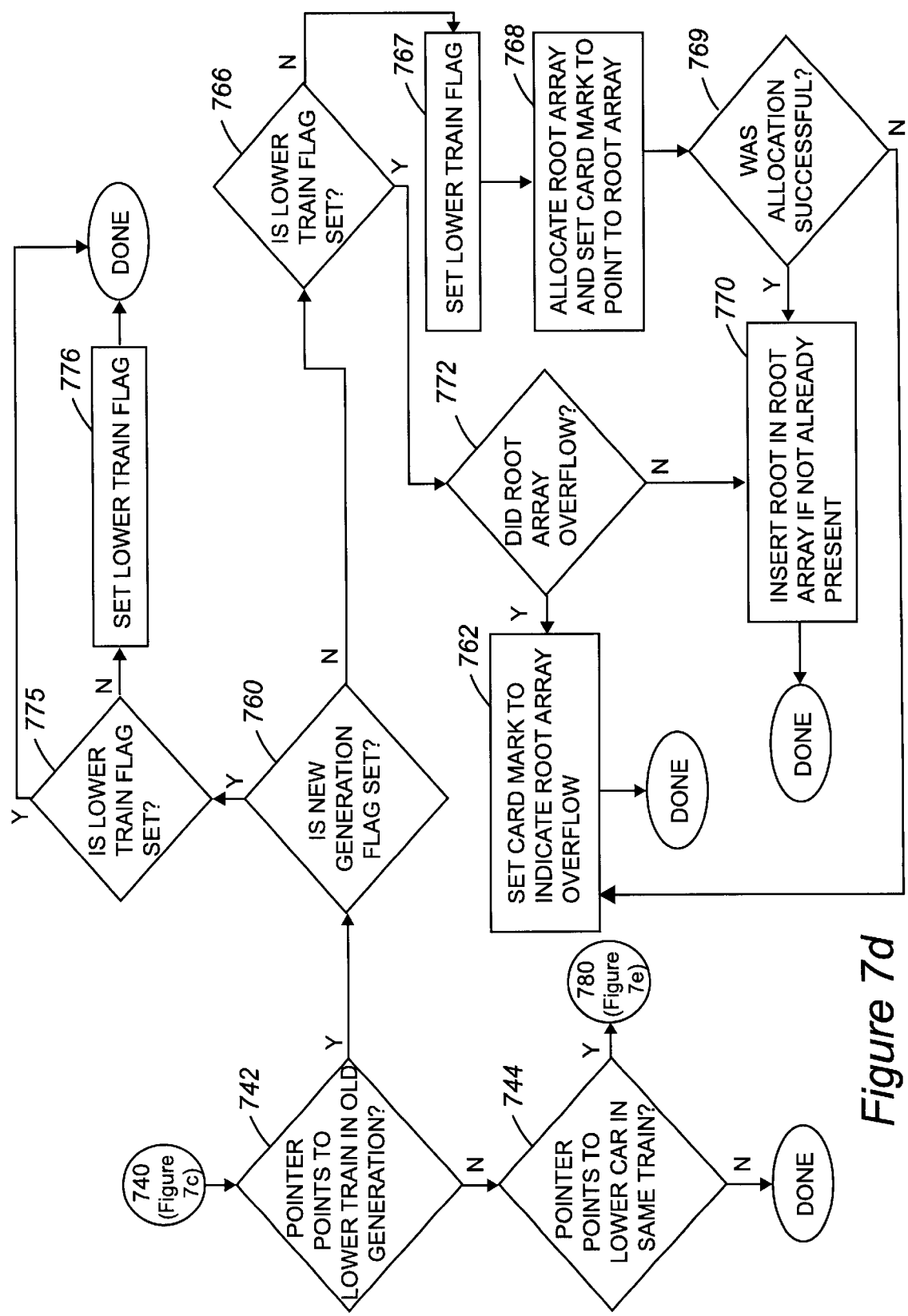
Figure 7E:
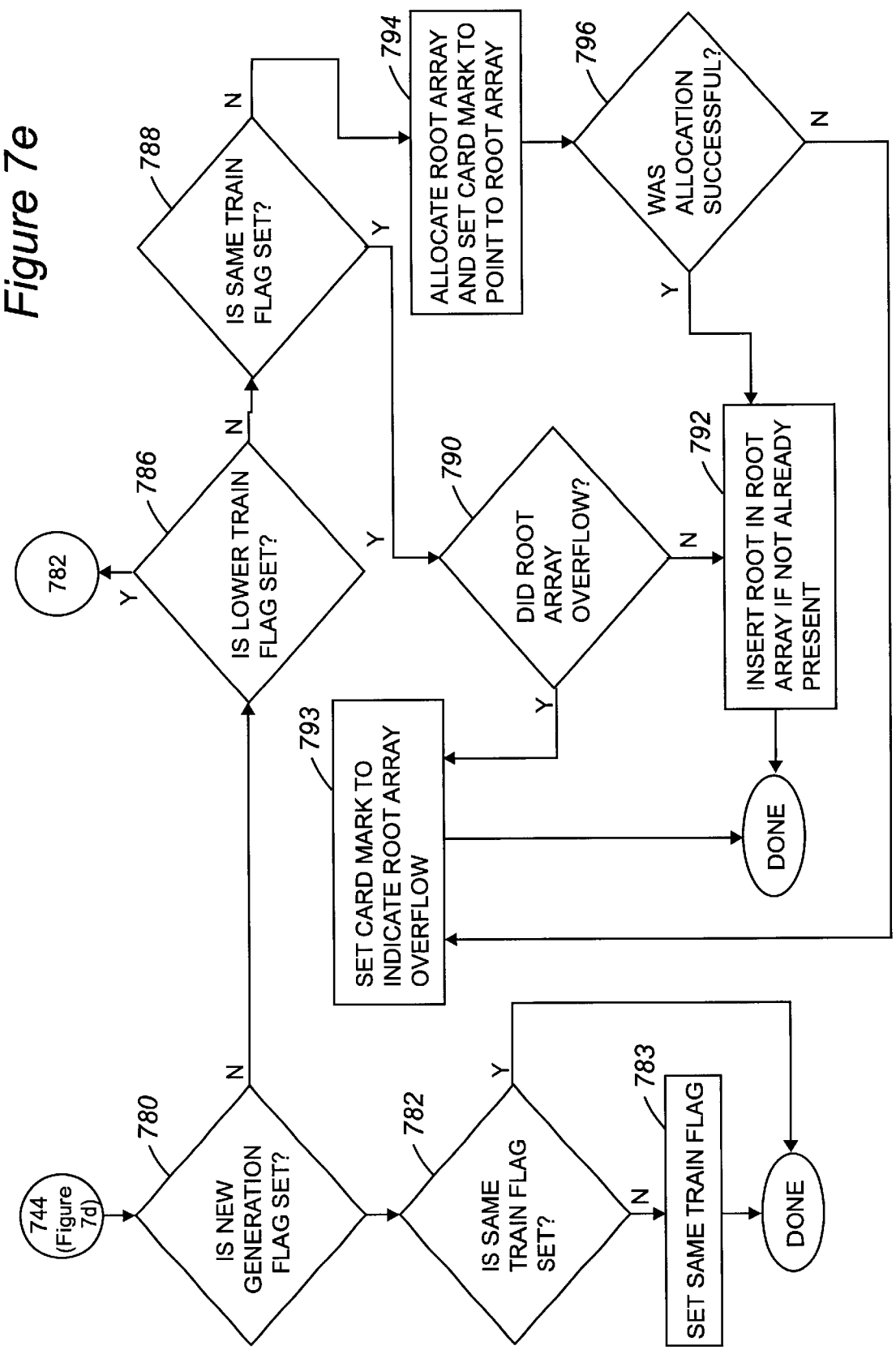

With respect to FIGS. 7c–7e, the steps associated with updating a card mark, i.e., step 728 of FIG. 7b, will be described in accordance with an embodiment of the present invention. In step 740, a determination is made as to whether the pointer points from the old generation to the new generation. If the pointer does point from the old generation to the new generation, then in step 746, it is determined whether the new generation flag is set to indicate that there is a pointer from the old generation to the new generation.

In step 752, a determination is made regarding whether the root array has overflowed when it is determined in step 746 that the new generation flag is set. If the root array is overflowed, then the process of updating a card mark is completed. If, however, the root array is not overflowed, then a determination is made in step 754 as to whether the root array is full. If it is determined that the root array is not full, process flow proceeds to step 750 in which the root, i.e., the root that is being followed, is inserted into the root array, and the process of updating a card mark is completed. If the root array is determined to be full in step 754, then process flow moves to step 755 where the card mark is set to indicate that there is an overflow of the root array. After the card mark is set, the card mark update process is completed.

Returning to step 746 and the determination of whether the new generation flag is set, when it is determined that the new generation pointer is not set, then in step 747, the new generation pointer is set to indicate that the pointer points from the old generation to the new generation. A root array is allocated and the card mark is set to point to the allocated root array in step 748. From step 748, process flow proceeds to step 749 which is the determination of whether the allocation of the root array was successful. If the allocation of the root array was successful, then the followed root is inserted in the root array in step 750. On the other hand, if the allocation of the root array was not successful, then process flow proceeds to step 755 where the card mark is set to indicate that the root array is overflowed. In one embodiment, setting the card mark to indicate that the root array is overflowed involves setting the pointer, i.e., the 27-bit pointer, in the card mark to null.

If the determination in step 740 was that the pointer does not point from the old generation to the new generation, then process flow proceeds to step 742 which is the determination of whether there is a pointer which points to a lower train in the old generation. If it is determined that the pointer points to a lower train in the old generation, then a determination is made in step 760 as to whether the new generation flag is set to indicate that there is a pointer from the old generation to the new generation. If the indication is that the new generation flag is set, then process flow proceeds to step 775, which is the determination of whether the lower train flag is set. In the described embodiment, the lower train flag is the third lowest bit in the card mark, and indicates whether the pointer points into a lower train, as described above. If the determination is that the lower train flag is set, the process of updating the card mark is completed. Alternatively, if the determination is that the lower train flag is not set, then the lower train flag is set in step 776. Once the lower train overflow flag is set, then the card mark update process is completed.

If it is determined in step 760 that the new generation flag is not set, then process flow moves to step 766 where it is determined whether the lower train flag is set. If the determination in step 766 is that the lower train flag is not set, then the lower train flag is set in step 767 to indicate the existence of a pointer to a lower train. Once the lower train flag is set, a root array is allocated and the card mark is set to point to the allocated root array in step 768. A determination is then made in step 769 regarding whether the allocation of the new root array was successful. If the allocation was successful, then in step 770, the followed root is inserted in the root array, in the event that the root is not already present in the root array. Then, the process of updating the card mark is completed. On the other hand, if the allocation of a new root array in step 769 was not successful, then process flow moves from step 769 to step 762 where the card mark is set to indicate a root array overflow. After the card mark is set to indicate a root array overflow, the process of updating the card mark is completed.

Returning to step 766, if the determination is that the lower train flag is set to indicate that there is a pointer to a lower train, then a determination is made in step 772 regarding whether the corresponding root array is overflowed. If the root array is overflowed, then the card mark is set to indicate a root array overflow in step 762. Alternatively, if the root array is determined not to be overflowed in step 772, then the followed root is inserted in the root array in step 770, if the root is not already present in the root array.

Referring back to step 742, which is the step of determining if a pointer points to a lower train in the old generation, if it is determined that a pointer does not point to a lower train in the old generation, then in step 744, a determination is made as to whether a pointer points to a lower car in the same train. If a pointer does not point to a lower car in the same train, then the card mark update process is completed. If, however, the determination is that a pointer does point to a lower car in the same train, then process flow proceeds to step 780, which is the determination of whether the new generation flag is set to indicate that there is a pointer to a new generation.

If the indication in step 780 is that the new generation flag is set, then a determination is made in step 782 as to whether the same train flag is set. That is, a determination is made regarding whether there is a pointer into a lower car of the same train. If the same train flag is set, then the process of updating a card mark is completed. Alternatively, if the same train flag is not set, then the same train flag is set in step 783. Once the same train flag is set, then the process of updating a card mark is completed.

When it is determined in step 780 that the new generation flag is not set, then process flow proceeds to step 786 where a determination is made regarding whether the lower train flag of the card mark is set to indicate that there is a pointer to a lower train. If the lower train flag is set, then process flow proceeds to step 782 where a determination is made regarding whether the same train flag is set.

If the lower train flag is not set, or indicates that pointers to a lower train are not in existence, then process flow moves from step 786 to step 788 where a determination is made regarding whether the same train flag of the card mark is set. Step 788, in other words, is the determination of whether the card mark indicates that there is a pointer to a lower card of the same train. If it is determined that the same train flag is set, then in step 790, it is determined whether a root array associated with the card mark is overflowed. If the root array is overflowed, then the card mark is set to indicate that the root array is overflowed in step 793. Alternatively, if it is determined that the root array is not overflowed, then, in step 792, the root is inserted in the root array in the event that the root is not already present in the root array. After the root is inserted in the block array, if necessary, the process of updating a card mark is completed.

Returning to step 788, if it is determined that the same train flag is not set, then a root array is allocated in step 794.

Further, the card mark is set to point to the allocated root array. In step 796, it is determined whether the allocation of the root array was successful. If the allocation of the root array was not successful, then the card mark is set to indicate a root array overflow in step 782. On the other hand, if the allocation of the root array was successful, then process flow proceeds to step 792 where the root is inserted into the root array, if the root is not already present in the root array.

Figure 8A:
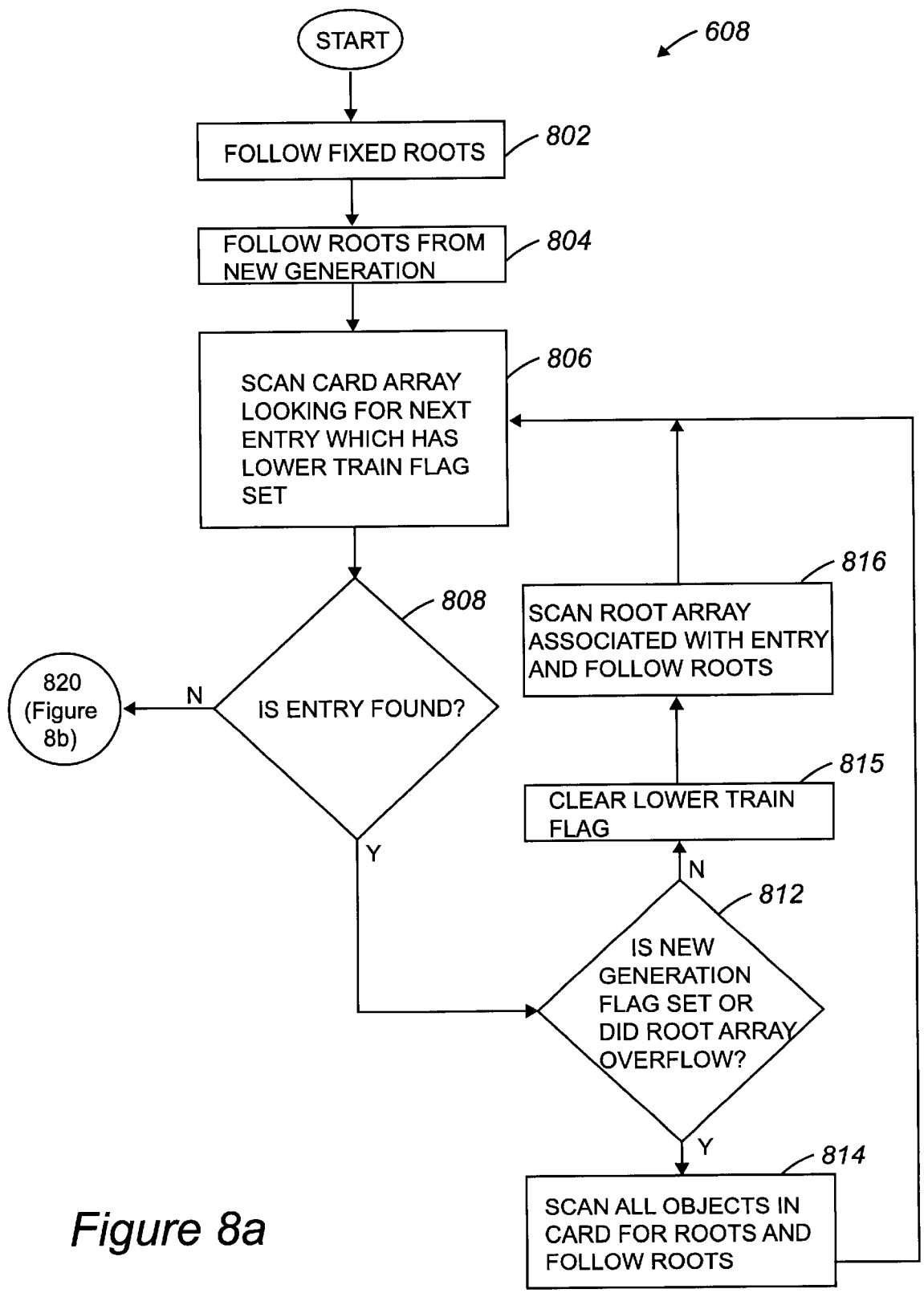
FIGS. 8a and 8b are a process flow diagram which illustrates the steps associated with performing an old generation garbage collection, i.e., step 608 of FIG. 6, in accordance with an embodiment of the present invention.
Figure 8B:
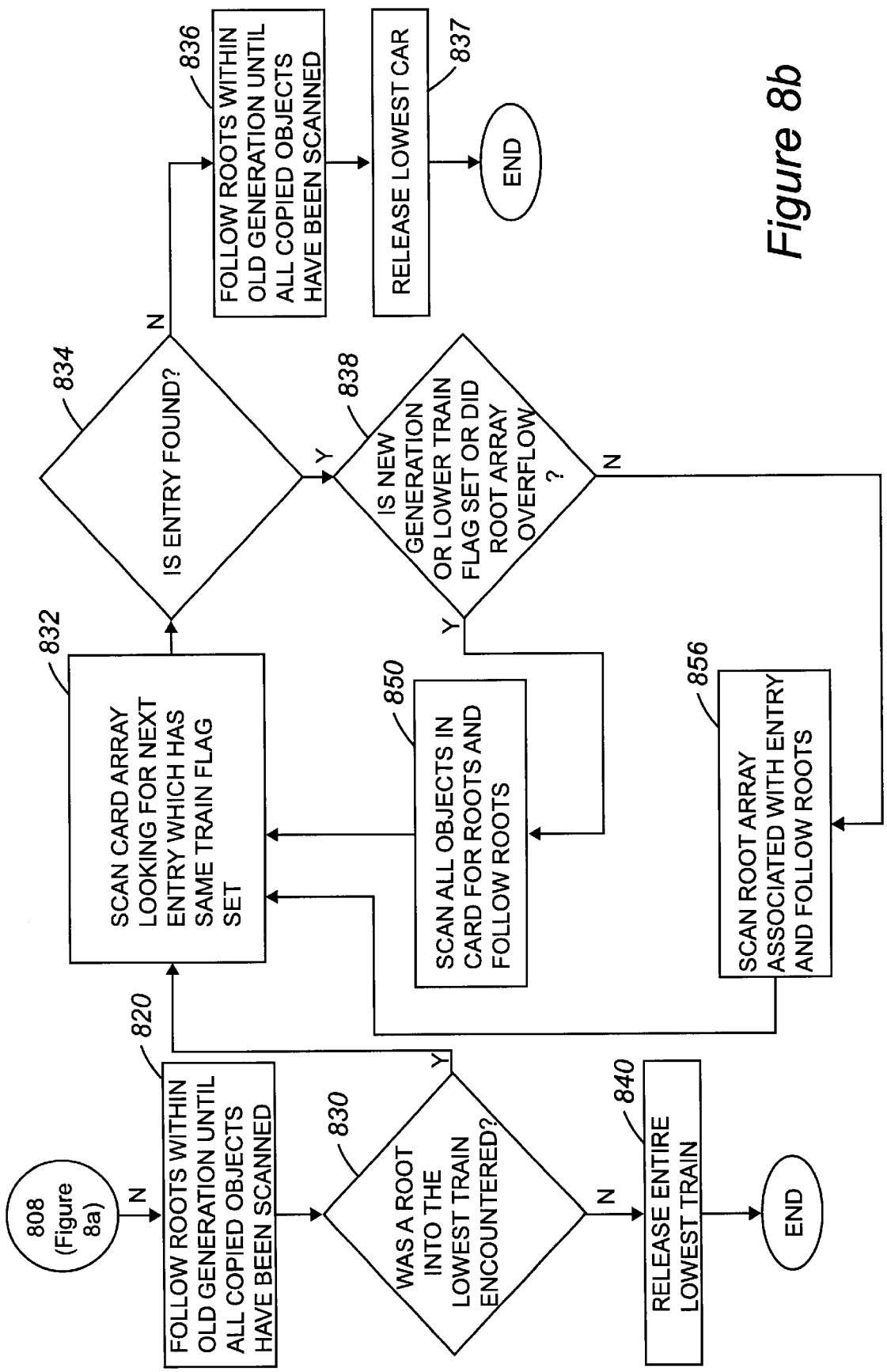

FIGS. 8a and 8b are process flow diagrams which illustrate the steps associated with performing garbage collection in old generation memory, i.e., step 608 of FIG. 6, in accordance with an embodiment of the present invention. In step 802, fixed roots or, in this embodiment, roots which directly point into old generation memory, are followed. The steps associated with following the fixed roots, according to an embodiment of the present invention, were described above with respect to FIGS. 7b–7e.

Roots from the new generation are followed in step 804. That is, the associations of roots which point from the new generation to the old generation are followed. Process flow moves from step 804 to step 806 in which the card array, or the array of card marks, is scanned in order to locate the next entry which has a lower train flag that is set. In step 808, it is determined whether such an entry, i.e., an entry which has a lower train flag that is set, has been found. If it is determined that such an entry has been found, then a determination is made in step 812 regarding whether the entry that was found has either, or both, a new generation flag that is set or a root array which is overflowed. If either, or both, the new generation flag is set or a root array is overflowed, then in step 814, all the objects in the card are scanned for roots, and the roots are followed. Again, the steps associated with following a root were previously discussed with respect to FIGS. 7b–7e. After the roots are followed, process flow returns to step 806 where the card array is scanned to locate the next entry which has a lower train flag that is set.

If it is determined in step 812 that the entry, i.e., card mark, that was found in step 808 does not have a new generation flag that is set or a root array that is overflowed, then process flow moves to step 816 where the root associated with the entry is scanned, and the roots associated with the root array are followed. After the roots are followed, the card array is scanned in step 806 for the next entry which has a lower train flag that is set.

Returning to step 808, if scanning the card array looking for an entry which has a lower train flag that is set results in no entry being found, then in step 820, the roots are followed within the old generation until all copied objects have been scanned. In one embodiment, objects in one train which are referenced from other trains are copied into those trains. When all copied objects have been scanned, a determination is made in step 830 regarding whether a root which points into the lowest train was encountered during the scanning process. If the determination is that a root into the lowest train was not encountered, then the entire lowest train is released in step 840. In other words, old generation memory held by the lowest train is freed. The entire lowest train may be freed due to the fact that if no pointers into the lowest train exist, the lowest train contains only garbage. It should be appreciated that cyclic structures which reference each other and are located in different cars of the same train may be collected when the entire lowest train is freed. Once the entire lowest train is freed, the steps associated with an old generation garbage collection are completed.

If it is determined in step 830 that a root into the lowest train was encountered, then in step 832, the card array is scanned to look for the next entry, i.e., card mark, which has a same train flag that is set. In step 834, a determination is made regarding whether an entry with a same train flag that is set has been found. If the determination is that an entry with a same train flag that is set has not been found, then the roots are followed within the old generation until all copied objects have been scanned in step 836. Scanning all copied objects involves, in one embodiment, a transitive search for pointers. Once all copied objects have been scanned, the lowest car in the lowest train is released in step 837, and an old generation garbage collection process is completed.

Returning to step 834, if the determination is that an entry, or card mark, with a same train flag that is set has been found, then process flow proceeds to step 838 where a determination is made regarding whether the entry has a new generation flag that is set, a lower train flag that is set, or a root array that is overflowed. If the entry has any of or all of a new generation flag that is set, then in step 850, all objects in the card are scanned for roots, which are followed. Once the roots are followed, process flow returns to step 832 where the card array is once again scanned to look for the next entry which has a same train flag that is set.

If the determination in step 838 is that the entry found in step 834 does not include a new generation flag that is set, a lower train flag that is set, or a root array that is overflowed, then the root array associated with the entry is scanned in step 856, and the roots in the root array are followed. After the roots are followed, process flow returns to step 832 where the card array is scanned to look for the next entry which has a same train flag that is set.

Figure 9:
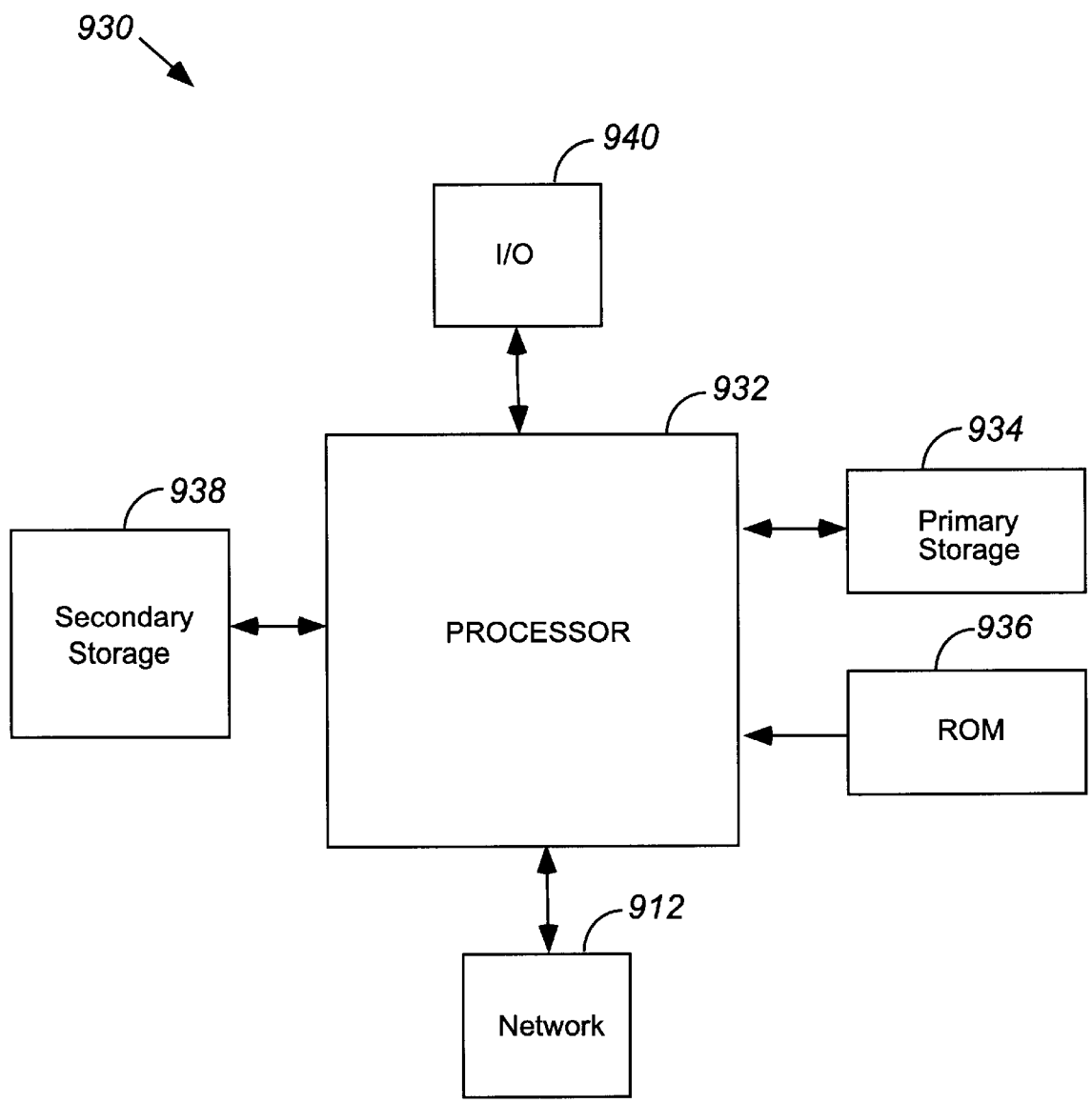
FIG. 9 is a diagrammatic representation of a computer system suitable for implementing the present invention.

It should be appreciated that a computer program which uses inter-generational garbage collection in accordance with the present invention may be implemented on a variety of different computer systems. FIG. 9 illustrates a typical, general purpose computer system suitable for implementing the present invention. The computer system 930 includes any number of processors 932 (also referred to as central processing units, or CPUs) that are coupled to memory devices including primary storage devices 934 (typically a read only memory, or ROM) and primary storage devices 936 (typically a random access memory, or RAM). As is well known in the art, ROM acts to transfer data and instructions uni-directionally to the CPU 932, while RAM is used typically to transfer data and instructions in a bi-directional manner. Both primary storage devices 934, 936 may include any suitable computer-readable media. A secondary storage medium 938, which is typically a mass memory device, is also coupled bi-directionally to CPU 932 and provides additional data storage capacity. The mass memory device 938 is a computer-readable medium that may be used to store programs including computer code, data and the like and is typically a storage medium such as a hard disk or a tape that are generally slower than primary storage devices 934, 936. Mass memory storage device 938 may take the form of a magnetic or paper tape reader or some other well-known device. It will be appreciated that the information retained within the mass memory device 938, may, in appropriate cases, be incorporated in standard fashion as part of RAM 936 as virtual memory. A specific primary storage device 934 such as a CD-ROM may also pass data uni-directionally to the CPU.

CPU 932 is also coupled to one or more input/output devices 940 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 932 optionally may be coupled to a computer or telecommunications network, e.g., an Internet network or an intranet network, using a network connection as shown generally at 912. With such a network connection, it is contemplated that the CPU 932 might receive information from the network, or might output information to the network in the course of performing the above-described method steps. Such information, which is often represented as a sequence of instructions to be executed using CPU 932, may be received from and outputted to the network in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or scope of the invention. By way of example, steps involved with new generation garbage collection and the old generation garbage collection may be reordered. Steps may also be removed or added without departing from the spirit or the scope of the present invention.

While generational garbage collection has been described as being performed in a new generation and an old generation of memory, generational garbage collection may be performed over many generations of memory. That is, generational garbage collection methods of the present invention may be performed on memory that is divided into multiple generations, e.g., a new generation, an "intermediate generation," and an old generation, which are segregated by the age of objects within each generation. It should be appreciated that for embodiments in which there are multiple generations, an inter-generational pointer may generally point between any two generations.

The card mark has been described as being a 32-bit word which includes a 27-bit pointer, a reserved bit, a same train flag, a lower train flag, a new generation flag, and a dirty flag. However, it should be appreciated that the card mark may be varied without departing from the spirit of the scope of the present invention. For example, the card mark may include fewer than 32 bits or more than 32 bits, depending at least in part upon the particular requirements of a given system. Alternatively, the bits within a card mark may also be widely varied. By way of example, in one embodiment, the 32-bits within a card mark may include a 26-bit pointer and two "status indicator" bits, or tag bits. The status indicator bits may be arranged such that different combinations of values for the status indicator bits indicate whether a card mark is dirty, clean, includes a new generation pointer, or does not include a new generation pointer. The card mark may also include a lower train flag which indicates whether there are any pointers to a lower train, a same train flag which indicates whether there are any pointers within a given train to a lower car in that train, a lower train overflow flag, and a same train overflow flag.

Further, although the lowest bits within a card mark are described as being flags which are used to indicate, for example, whether the card mark is dirty, as described above, it should be appreciated that the flags within a card mark may be located in any suitable position within the card mark. The bits which represent flags may be the highest bits within a card mark. Alternatively, the bits may be interspersed throughout a card mark.

Although the size of a car in old generation memory has been described as being fixed, it should be appreciated that, in one embodiment, the size of a car may be dynamically allocated. That is, the size of a car may be determined based upon the particular requirements of objects which are to be placed within the car. By way of example, the size of a car may be allocated during the course of garbage collection process to minimize the number of pointers which originate with objects within the car without departing from the spirit or the scope of the present invention.

It should be appreciated that conventional methods for garbage collection may occasionally be implemented within old generation memory. By way of example, in some cases, it may be possible for old generation memory to become full. When old generation memory is full, performing old generation garbage collection on a car may not free up a sufficient amount of memory for immediate use. As such, a conventional garbage collection process, such as a mark sweep collection process, may be implemented to free as much old generation memory as possible in the event that the old generation memory is full without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for dynamically managing memory associated with a computer system, the memory including a first memory section and a second memory section that is divided into a plurality of blocks, the blocks in the second memory section each having an associated marker, the method comprising:

performing a first garbage collection on the first memory section;

performing a second garbage collection on a selected one of the blocks in the second memory section;

performing a third garbage collection on the selected block in the second memory section, wherein the third garbage collection includes determining whether the selected block includes a first object which references a second object which is not included in the selected block based at least in part on a status indicated by the marker associated with the selected block, wherein the status includes an indication of whether the reference to the second object was stored after the second garbage collection was performed; and when the reference to the second object was stored after the second garbage collection was performed, creating a new root array using the selected marker.

2. A computer-implemented method as recited in claim 1 wherein when it is determined that the first object does not reference a second object which is not included in the selected block, the method further includes releasing the selected block.

3. A computer-implemented method as recited in claim 1 wherein when it is determined that the selected block includes a first object which references a second object, the step of performing the third garbage collection further includes:

determining whether the second object is in the first memory section using the selected block marker; and when it is determined that the second object is in the first memory section, a root array associated with the selected block marker is updated to insure that the root array associated with the selected block marker includes a pointer to the second object.

4. A computer-implemented method as recited in claim 1 wherein when it is determined that the selected block includes a first object which references a second object, the step of performing the third garbage collection further includes:

determining whether the second object is in the second memory section using the selected block marker; and when it is determined that the second object is in the second memory section, a root array associated with the selected block marker is scanned to identify references to other objects.

5. A computer-implemented method as recited in claim 4 further including following the references to other objects.

6. A computer-implemented method as recited in claim 1 wherein the plurality of blocks are arranged as a plurality of trains, the selected block being included in a first one of the plurality of trains, the step of performing the third garbage collection further including:

determining whether the second object is in a second one of the plurality of trains based at least in part on the status indicated by the marker associated with the block.

7. A computer-implemented method as recited in claim 6 wherein when it is determined that the second object is not in a second one of the plurality of trains, the method further includes releasing the second train.

8. A computer-implemented method as recited in claim 1 wherein the plurality of blocks are arranged as a plurality of cars, the plurality of cars further being arranged as a plurality of trains, the selected block being included in a first one of the plurality of cars that forms a selected one of the plurality of trains, the step of performing the third garbage collection further including:

determining whether the second object is in a second one of the plurality of cars that forms the selected train based at least in part on the status indicated by the marker associated with the block.

9. A computer-implemented method as recited in claim 8 wherein when it is determined that the second object is not in the second car of the selected train, the method further includes releasing the second car.

10. A computer-implemented method for dynamically managing memory associated with a computer system, the memory being divided into a plurality of blocks, the blocks each having an associated marker, the method comprising:

performing a first garbage collection on a selected one of the blocks;

performing a second garbage collection on the selected block, wherein the second garbage collection includes determining whether the selected block includes a first object which references a second object which is not included in the selected block based at least in part on a status indicated by the marker associated with the selected block, the status indicated by the marker including an indication of whether the reference to the second object was stored after the first garbage collection was performed; and when the reference to the second object was stored after the first garbage collection was performed, creating a new root array using the selected block.

11. A computer-implemented method as recited in claim 10 wherein when it is determined that the first object does not reference a second object which is not included in the selected block, the method further includes releasing the selected block.

12. A computer-implemented method as recited in claim 10 wherein the plurality of blocks are arranged as a plurality of trains, the selected block being included in a first one of the plurality of trains, the step of performing the garbage collection further including:

determining whether the second object is in a second one of the plurality of trains based at least in part on the status indicated by the marker associated with the block.

13. A computer-implemented method as recited in claim 12 wherein when it is determined that the second object is not in a second one of the plurality of trains, the method further includes releasing the second train.

14. A computer-implemented method as recited in claim 10 wherein the plurality of blocks are arranged as a plurality of cars, the plurality of cars further being arranged as a plurality of trains, the selected block being included in a first one of the plurality of cars that forms a selected one of the plurality of trains, the step of performing the garbage collection further including:

determining whether the second object is in a second one of the plurality of cars that forms the selected train based at least in part on the status indicated by the marker associated with the block.

15. A computer-implemented method as recited in claim 14 wherein when it is determined that the second object is not in the second car of the selected train, the method further includes releasing the second car.

16. A computer-implemented method as recited in claim 10 further including an additional memory section, wherein when it is determined that the second object is not included in the selected block, the step of performing the garbage collection on the selected block further includes determining whether the second object is included in the additional memory section based at least in part on the status indicated by the marker associated with the selected block.

17. A computer-implemented method for allocating a selected object in computer memory, the computer memory including a first section, a second section, and an array of words associated with elements in the second section, the words being arranged to indicate whether the contents of their associated elements reference objects in the first section, the method comprising:

determining whether the first section is suitable for the selected object to be allocated;

allocating the selected object when it is determined that the first section is suitable for the object to be allocated; and performing a garbage collection in the first section when it is determined that the first section is not suitable for the selected object to be allocated, wherein performing the garbage collection includes scanning the array of words to locate selected words that indicate that their associated elements in the second section reference particular objects in the first section, and wherein the particular objects in the first section are retained during the garbage collection.

18. A computer-implemented method as recited in claim 17 wherein when the selected markers that indicate that their associated elements in the second section reference the particular objects are located, performing the garbage collection in the first section further includes:

following associations of roots within the associated elements in the second section, wherein following the associations of the roots includes updating the roots to new locations within the computer memory and updating the selected words.

19. A computer-implemented method as recited in claim 18 wherein updating the selected words includes:

determining when a selected one of the roots is in the second section and references a selected one of the particular objects is in the first section; and when it is determined that the selected root is in the second section and references the selected particular object in the first section, updating the selected words to indicate that the selected root is in the second section and the selected particular object is in the first section.

20. A computer-implemented method as recited in claim 17 further including:

performing a garbage collection in the second section, wherein performing the garbage collection includes following associations of roots associated with selected ones of the elements, the roots being associated with the new generation, whereby following the associations of the roots involves updating some of the words in the array of words.

21. A computer-implemented method as recited in claim 20 wherein performing the garbage collection in the second section further includes:

scanning the array of markers to locate a first word selected from the array of words which indicates that its associated element in the second section is suitable for release; and releasing the element.

22. A computer-implemented method as recited in claim 17 wherein scanning the array of words to locate selected words that indicate that their associated elements in the second section reference particular objects in the first section includes identifying a root array which includes addresses for the particular referenced objects.

23. A computer readable medium for use in a computer system including a first memory section and a second memory section that is arranged as a plurality of elements, the computer readable medium having computer code for configuring a marker, the marker being associated with a first element selected from the plurality of elements, the marker comprising:

a first indicator arranged to identify whether the first selected element references an object contained within the first memory section.

24. A computer readable medium for use in a computer system as recited in claim 23 wherein the marker further includes a reference to the object.

25. A computer readable medium for use in a computer system as recited in claim 24 wherein the reference to the object is a pointer to an array which contains an address for the object.

26. A computer readable medium for use in a computer system as recited in claim 23, wherein the marker further includes a second indicator arranged to identify whether the first selected element references a second element selected from the plurality of elements.

27. A computer readable medium for use in a computer system as recited in claim 23 wherein the plurality of elements is organized such that a first set of the elements selected from the plurality of elements forms a first car arrangement and a second set of the elements selected from the plurality of elements forms a second car arrangement, the first selected element being included in the first car arrangement, the first car arrangement and the second car arrangement further forming a train, the marker further including:

a second indicator arranged to identify whether the first selected element references a second element selected from the plurality of elements, the second selected element being included in the second car arrangement.

28. A computer readable medium for use in a computer system as recited in claim 27, wherein the marker further includes a reference to the second selected element, wherein the reference is a pointer to an array which includes an address associated with the second selected element.

29. A computer readable medium for use in a computer system as recited in claim 23 wherein the plurality of elements is organized such that a first set of the elements selected from the plurality of elements forms a first car arrangement and a second set of the elements selected from the plurality of elements forms a second car arrangement, the first selected element being included in the first car arrangement, the first car arrangement being a part of a first train and the second car arrangement being a part of a second train, the marker further including:
    a second indicator arranged to identify whether the first selected element references a second element selected from the plurality of elements, the second selected element being included in the second car arrangement.

30. A computer readable medium for use in a computer system as recited in claim 29, wherein the marker further includes a reference to the second selected element, wherein the reference is a pointer to an array which includes an address associated with the second selected element.

31. A computer system comprising:
    memory including a first memory section and a second memory section that is segmented into a plurality of blocks;
    an array of markers, each marker corresponding to an associated block in the second memory section, the markers being configured to indicate when their associated blocks reference objects outside of their associated block;
    a set of root arrays, the root arrays being arranged to hold addresses of the objects, wherein selected markers from the array of markers are associated with the set of root arrays;
    a first garbage collector for reclaiming space within the first memory section; and
    a second garbage collector for reclaiming space within the second memory section based at least in part upon the status of the markers in the array of markers.

32. A computer system as recited in claim 31 wherein a first marker selected from the array of markers includes a section indicator that identifies when the associated block of the first marker references a first object in the first memory section.

33. A computer system as recited in claim 31 wherein the plurality of blocks is arranged as a plurality of cars, the plurality of cars further being arranged as a plurality of trains.

34. A computer system as recited in claim 33 wherein a first marker selected from the array of markers includes a car indicator that identifies when the associated block of the first marker references a first block of a first car selected from the plurality of cars, the block associated with the first marker being a part of a second car selected from the plurality of cars, the first car and the second car being a part of a first train selected from the plurality of trains.

35. A computer system as recited in claim 33 wherein a first marker selected from the array of markers includes a train indicator that identifies when the associated block of the first marker references a first block of a first car of a first train selected from the plurality of trains, the block associated with the first marker being a part of a second car of a second train selected from the plurality of trains.

36. A computer system as recited in claim 31 wherein the root arrays are created from selected markers from the array of markers.

37. A computer system as recited in claim 31 wherein the objects include newer objects and older objects, the newer objects being associated with the first memory section, and the older objects being associated with the second memory section.

38. A computer system comprising:
    memory that is segmented into a plurality of blocks;
    an array of markers, each marker corresponding to an associated block in the memory, the markers being configured to indicate when their associated blocks reference objects outside of their associated block;
    a set of root arrays, the root arrays being arranged to hold addresses of the objects, wherein selected markers from the array of markers are associated with the set of root arrays; and
    a garbage collector for reclaiming space within the memory based at least in part upon the status of the markers in the array of markers.

39. A computer system as recited in claim 38 wherein the plurality of blocks is arranged as a plurality of cars, the plurality of cars further being arranged as a plurality of trains.

40. A computer system as recited in claim 39 wherein a first marker selected from the array of markers includes a car indicator that identifies when the associated block of the first marker references a first block of a first car selected from the plurality of cars, the block associated with the first marker being a part of a second car selected from the plurality of cars, the first car and the second car being a part of a first train selected from the plurality of trains.

41. A computer system as recited in claim 39 wherein a first marker selected from the array of markers includes a train indicator that identifies when the associated block of the first marker references a first block of a first car of a first train selected from the plurality of trains, the block associated with the first marker being a part of a second car of a second train selected from the plurality of trains.

42. A computer program product for dynamically managing memory associated with a computer system, the computer program product comprising:
    computer code that performs a first garbage collection in a first memory section of the computer;
    computer code that performs a second garbage collection on a second memory section of the computer, the second memory section being divided into a plurality of blocks, wherein the second garbage collection includes determining whether a block selected from the plurality of blocks includes a first object which references a second object which is not included in the selected block based at least in part on a status indicated by the marker associated with the selected block; and
    a computer readable medium that stores the computer codes.

43. A computer program product as recited in claim 42 further including:
    computer code that releases the selected block when it is determined that the first object does not reference a second object which is not included in the selected block.

44. A computer program product as recited in claim 42 further including:
    computer code that determines whether the second object is in the first memory section using the selected block marker when it is determined that the selected block includes a first object which references a second object; and computer code that updates a root array associated with the selected block marker to insure that the root array includes a pointer to the second object when it is determined that the second object is in the first memory section.

45. A computer program product as recited in claim 42 further including:

computer code that determines whether the second object is in the second memory section using the selected block marker when it is determined that the selected block includes a first object which references a second object; and computer code that scans a root array associated with the selected block marker to identify references to other objects when it is determined that the second object is in the second memory section.

46. A computer program product for causing a processor of a computer system to dynamically manage memory associated with the computer system, the computer program product comprising:

computer code that performs a first garbage collection in a first memory section of the computer;

computer code that performs a second garbage collection on a second memory section of the computer, the second memory section being divided into a plurality of blocks, wherein the second garbage collection includes determining whether a block selected from the plurality of blocks includes a first object which references a second object which is not included in the selected block based at least in part on a status indicated by the marker associated with the selected block; and a computer data signal embodied in a carrier wave that represents the computer codes.

47. A computer program product as recited in claim 46 further including:

computer code that releases the selected block when it is determined that the first object does not reference a second object which is not included in the selected block.

48. A computer program product as recited in claim 46 further including:

computer code that determines whether the second object is in the first memory section using the selected block marker when it is determined that the selected block includes a first object which references a second object; and computer code that updates a root array associated with the selected block marker to insure that the root array includes a pointer to the second object when it is determined that the second object is in the first memory section.

49. A computer program product as recited in claim 46 further including:

computer code that determines whether the second object is in the second memory section using the selected block marker when it is determined that the selected block includes a first object which references a second object; and computer code that scans a root array associated with the selected block marker to identify references to other objects when it is determined that the second object is in the second memory section.

* * * * *

UNITED STATES PATENT AND TRADEMARK OFFICE
CERTIFICATE OF CORRECTION

PATENT NO. : 6,308,185 B1
DATED : October 23, 2001
INVENTOR(S) : Grarup et al.

It is certified that error appears in the above-identified patent and that said Letters Patent is hereby corrected as shown below:

Column 2,
Line 24, change "preformed" to -- performed --.
Line 50, between "and" and "to" add -- points --.

Column 7,
Line 58, change "fill" to -- full --.

Column 11,
Line 6, change "IN" to -- In --.

Signed and Sealed this

Sixteenth Day of April, 2002

Attest:

JAMES E. ROGAN
*Attesting Officer*   *Director of the United States Patent and Trademark Office*